United States Patent
Lee

(10) Patent No.: US 10,534,703 B2
(45) Date of Patent: Jan. 14, 2020

(54) MEMORY SYSTEM AND OPERATION METHOD THEREOF

(71) Applicant: SK hynix Inc., Gyeonggi-do (KR)

(72) Inventor: Jong-Min Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 160 days.

(21) Appl. No.: 15/061,746

(22) Filed: Mar. 4, 2016

(65) Prior Publication Data
US 2017/0109273 A1 Apr. 20, 2017

(30) Foreign Application Priority Data
Oct. 15, 2015 (KR) .................. 10-2015-0143850

(51) Int. Cl.
*G06F 12/00* (2006.01)
*G06F 12/02* (2006.01)
*G06F 3/06* (2006.01)

(52) U.S. Cl.
CPC .......... *G06F 12/0246* (2013.01); *G06F 3/064* (2013.01); *G06F 3/0605* (2013.01); *G06F 3/0679* (2013.01); *G06F 2212/214* (2013.01); *G06F 2212/657* (2013.01); *G06F 2212/7201* (2013.01); *G06F 2212/7205* (2013.01)

(58) Field of Classification Search
None
See application file for complete search history.

(56) References Cited

U.S. PATENT DOCUMENTS

| | | | |
|---|---|---|---|
| 2011/0022819 A1* | 1/2011 | Post | G06F 12/0246 711/207 |
| 2011/0153913 A1* | 6/2011 | Huang | G11C 7/1042 711/103 |
| 2012/0117444 A1* | 5/2012 | Arya | G06F 11/108 714/763 |
| 2012/0179853 A1* | 7/2012 | Manning | G06F 12/0246 711/3 |
| 2013/0124794 A1* | 5/2013 | Bux | G06F 12/0246 711/103 |

FOREIGN PATENT DOCUMENTS

| | | |
|---|---|---|
| KR | 101384435 | 4/2014 |
| KR | 101392174 | 5/2014 |
| KR | 101497860 | 3/2015 |
| KR | 101507669 | 3/2015 |

* cited by examiner

*Primary Examiner* — Baboucarr Faal
(74) *Attorney, Agent, or Firm* — IP & T Group LLP

(57) ABSTRACT

A memory system may include a nonvolatile memory device including a plurality of blocks each including a plurality of pages, and a controller that selects a mapping block from the plurality of blocks, stores address information corresponding to each of other blocks, except for the mapping block and a free block among the plurality of blocks, in each of the plurality of pages, searches for a block including no valid page among the other blocks, and invalidates a page of the mapping block storing the address information corresponding to the searched block.

12 Claims, 15 Drawing Sheets

MEMORY SYSTEM AND OPERATION METHOD THEREOF

CROSS-REFERENCE TO RELATED APPLICATIONS

This application claims priority under 35 U.S.C, § 119 to Korean Patent Application No. 10-2015-0143850, filed on Oct. 15, 2015 in the Korean Intellectual Property Office, the disclosure of which is incorporated herein by reference in its entirety.

BACKGROUND

1. Field

Exemplary embodiments of the present invention relate to a semiconductor design technology, and more particularly, to a memory system supporting an address mapping operation.

2. Description of the Related Art

The computer environment paradigm has shifted to ubiquitous computing systems that can be used anywhere and at any time. As a result, the use of portable electronic devices, such as mobile phones, digital cameras and notebook computers has been increasing rapidly. These portable electronic devices generally use a memory system having a memory device for storing data, that is, a data storage device. A data storage device may be used as a main or an auxiliary memory device of a portable electronic device.

Data storage devices using memory devices provide excellent stability, durability, high information access speed and low power consumption since they have no moving parts. Examples of data storage devices having such advantages include universal serial bus (USB) memory devices, memory cards having various interfaces, and solid state drives (SSD).

SUMMARY

Various embodiments of the present invention relate to a memory system capable of efficiently performing an address mapping operation.

In an embodiment, a memory system may include: a nonvolatile memory device including a plurality of blocks each including a plurality of pages; and a controller that selects a mapping block from the plurality of blocks, stores address information corresponding to each of other blocks, except for the mapping block and a free block among the plurality of blocks, in each of the plurality of pages, searches for a block including no valid page among the other blocks, and invalidates a page of the mapping block storing the address information corresponding to the searched block.

Furthermore, when the nonvolatile memory device is not in a busy state, the controller may repeatedly search for the block including no valid page among the other blocks at a preset time interval, and invalidate the page of the mapping block storing the address information corresponding to the searched block.

Furthermore, the controller may invalidate the page of the mapping block storing the address information corresponding to a block selected as a victim block among the other blocks through a garbage collection operation and switched to a free block.

Furthermore, the controller may confirm whether a valid page is included in a block having its own address information to be updated among the other blocks, and invalidate the page of the mapping block storing the address information corresponding to the block including no valid page as a result of the confirmation.

Furthermore, the address information corresponding to each of the other blocks may include information for mapping a physical block address for selecting a block corresponding to its own block among the other blocks and a physical page address for respectively selecting valid pages included in the block corresponding to its own block among the other blocks with a logic address used in a host.

Furthermore the controller may select one or more of the plurality of blocks as the mapping block.

Furthermore, when the mapping block is selected as a victim block through a garbage collection operation, the controller may set a free block as a new mapping block and copy only valid address information of the mapping block selected as the victim block into the new mapping block.

In another embodiment, an operation method of a memory system including a nonvolatile memory device including a plurality of blocks each including a plurality of pages may include: classifying the plurality of blocks into a mapping block and other blocks, except for the mapping block and a free block; storing address information corresponding to each of the other blocks in each of the plurality of pages included in the mapping block; and searching for a block including no valid page among the other blocks after the storing, and invalidating a page of the mapping block storing the address information corresponding to the searched block.

Furthermore, the invalidating may include: repeatedly searching for the block including no valid page among the other blocks at a preset time interval when the nonvolatile memory device is not in a busy state; and invalidating the page of the mapping block storing the address information corresponding to the block searched through the searching.

Furthermore, the invalidating may include: selecting a victim block to be used in a garbage collection operation from the other blocks; and invalidating the page of the mapping block storing the address information corresponding to a block selected as a victim block among the other blocks through a garbage collection operation when the block is switched to a free block.

Furthermore, the invalidating may include: confirming whether a valid page is included in a block having its own address information to be updated among the other blocks; and invalidating the page of the mapping block storing the address information corresponding to an update target block configured to include no valid page as a result of the confirmation.

Furthermore, the address information corresponding to each of the other blocks may include information for mapping a physical block address for selecting a block corresponding to its own block among the other blocks and a physical page address for respectively selecting valid pages included in the block corresponding to its own block among the other blocks with a logic address used in a host.

Furthermore, in the classifying, one or more of the plurality of blocks are classified as the mapping block.

Furthermore, the operation method may further include: additionally classifying a free block into the mapping block when the mapping block is selected as a victim block through a garbage collection operation after the classifying; and copying only valid address information of the mapping block selected as the victim block into the mapping block newly classified in the additional classifying.

In accordance with the present technology, the nonvolatile memory device separately designates an entrance situation of a state update operation for a mapping block for storing an address mapping table. Consequently, it is possible to substantially prevent unnecessary data from being subjected to garbage collection in a mapping block.

DETAILED DESCRIPTION

Figure 1:
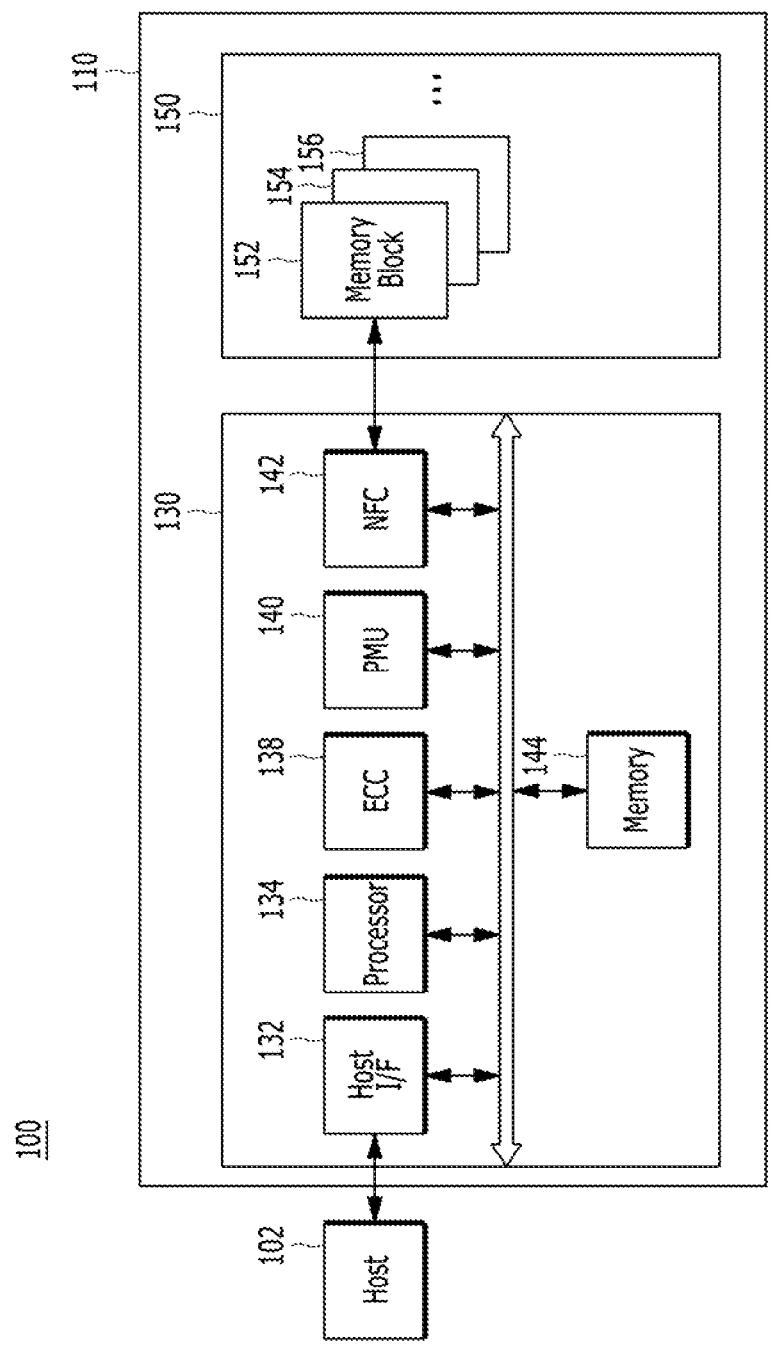
FIG. 1 is a diagram illustrating a data processing system including a memory system according to an embodiment of the present invention.

Various embodiments will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the invention to those skilled in the relevant art. Throughout the disclosure like reference numerals refer to like parts throughout the various figures and embodiments of the present invention.

FIG. 1 is a block diagram illustrating a data processing system including a memory system according to an embodiment.

Referring to FIG. 1, a data processing system 100 may include a host 102 and a memory system 110.

The host 102 may include, for example, a portable electronic device such as a mobile phone, an MP3 player and a laptop computer or an electronic device such as a desktop computer, a game player, a TV and a projector.

The memory system 110 may operate in response to a request from the host 102, and in particular, store data to be accessed by the host 102. In other words, the memory system 110 may be used as a main memory system or an auxiliary memory system of the host 102. The memory system 110 may be implemented with any one of various kinds of storage devices, according to the protocol of a host interface to be electrically coupled with the host 102. The memory system 110 may be implemented with any one of various kinds of storage devices such as a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and so forth.

The storage devices for the memory system 110 may be implemented with a volatile memory device such as a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM) and a resistive RAM (RRAM).

The memory system 110 may include a memory device 150 which stores data to be accessed by the host 102, and a controller 130 which may control storage of data in the memory device 150.

The controller 130 and the memory device 150 may be integrated into one semiconductor device. For instance, the controller 130 and the memory device 150 may be integrated into one semiconductor device and configure a solid state drive (SSD). When the memory system 110 is used as the SSD, the operation speed of the host 102 that is electrically coupled with the memory system 110 may be significantly increased.

The controller 130 and the memory device 150 may be integrated into one semiconductor device and configure a memory card. The controller 130 and the memory card 150 may be integrated into one semiconductor device and configure a memory card such as a Personal Computer Memory Card International Association PCMCIA) card a compact flash (CF) card, a smart media (SM) card (SMC), a memory stick, a multimedia card (MMC), an RS-MMC and a micro-MMC, a secure digital (SD) card, a mini-SD, a micro-SD and an SDHC, and a universal flash storage (UFS) device.

For another instance, the memory system 110 may configure a computer, an ultra-mobile PC (UMPC) a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RID device, or one of various component elements configuring a computing system.

The memory device 150 of the memory system 110 may retain stored data when power supply is interrupted and, in particular, store the data provided from the host 102 during a write operation, and provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells to which a plurality of word lines (WL) are electrically coupled. The memory device 150 may be a nonvolatile memory device, for example, a flash memory. The flash memory may have a three-dimensional (3D) stack structure. The structure of the memory device 150 and the three-dimensional (3D) stack structure of the memory device 150 will be described later in detail with reference to FIGS. 2 to 11.

The controller 130 of the memory system 110 may control the memory device 150 in response to a request from the host 102. The controller 130 may provide the data read from the memory device 150, to the host 102, and store the data provided from the host 102 into the memory device 150. To this end the controller 130 may control overall operations of the memory device 150, such as read, write, program and erase operations.

In detail, the controller 130 may include a host interface unit 132, a processor 134, an error correction code (ECC) unit 138, a power management unit 140, a NAND flash controller 142, and a memory 144.

The host interface unit 132 may process commands and data provided from the host 102, and may communicate with the host 102 through at least one of various interface protocols such as universal serial bus (USB), multimedia card (MMC), peripheral component interconnect-express (PCI-E), serial attached SCSI (SAS), serial advanced technology attachment (SATA), parallel advanced technology attachment (PATA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than or equal to a threshold number of correctable error bits, to and may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all circuits, systems or devices for the error correction operation.

The PMU 140 may provide and manage power for the controller 130, that is, power for the component elements included in the controller 130.

The NEC 142 may serve as a memory interface between the controller 130 and the memory device 150 to allow the controller 130 to control the memory device 150 in response to a request from the host 102. The NFC 142 may generate control signals for the memory device 150 and process data under the control of the processor 134 when the memory device 150 is a flash memory and, in particular, when the memory device 150 is a NAND flash memory.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read to from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be implemented with volatile memory. The memory 144 may be implemented with a static random access memory (SRAM) or a dynamic random access memory (DRAM). As described above the memory 144 may store data used by the host 102 and the memory device 150 for the read and write operations. To store the data, the memory 144 may include a program memory, a data memory, a write buffer, a read buffer, a map buffer, and so forth.

The processor 134 may control general operations of the memory system 110, and a write operation or a read operation for the memory device 150, in response to a write request or read request from the host 102. The processor 134 may drive firmware, which is referred to as a flash translation layer (FTL), to control the general operations of the memory system 110. The processor 134 may be implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fail seriously deteriorates the utilization efficiency of the memory device 150 having a 3D stack structure and the reliability of the memory systems 110, and thus reliable bad block management is required.

Figure 2:
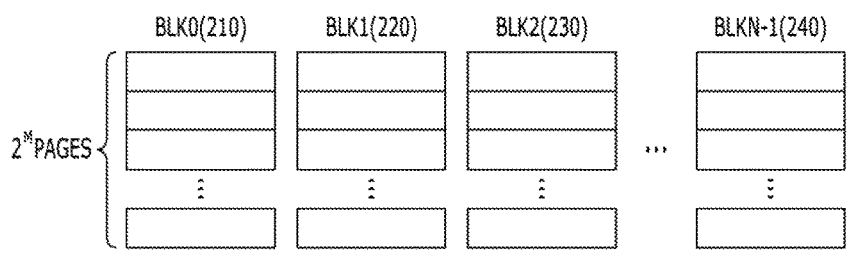
FIG. 2 is a diagram illustrating a memory device in a memory system, according to an embodiment of the present invention.

FIG. 2 is a schematic diagram illustrating the memory device 150 shown in FIG. 1.

Referring to FIG. 2, the memory device 150 may include a plurality of memory blocks, for example, zeroth to $(N-1)^{th}$ blocks 210 to 240. Each of the plurality of memory blocks 210 to 240 may include a plurality of pages, for example, $2^M$ number of pages ($2^M$ PAGES), to which the present invention will not be limited. Each of the plurality of pages may include a plurality of memory cells to which a plurality of word lines are electrically coupled.

Also, the memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. An MLC memory block including a plurality of pages which are implemented with memory cells that are each capable of storing bit data may be defined as a triple level cell (TLC) memory block.

Each of the plurality of memory blocks 210 to 240 may store the data provided from the host device 102 during a write operation, and may provide stored data to the host 102 during a read operation.

Figure 3:
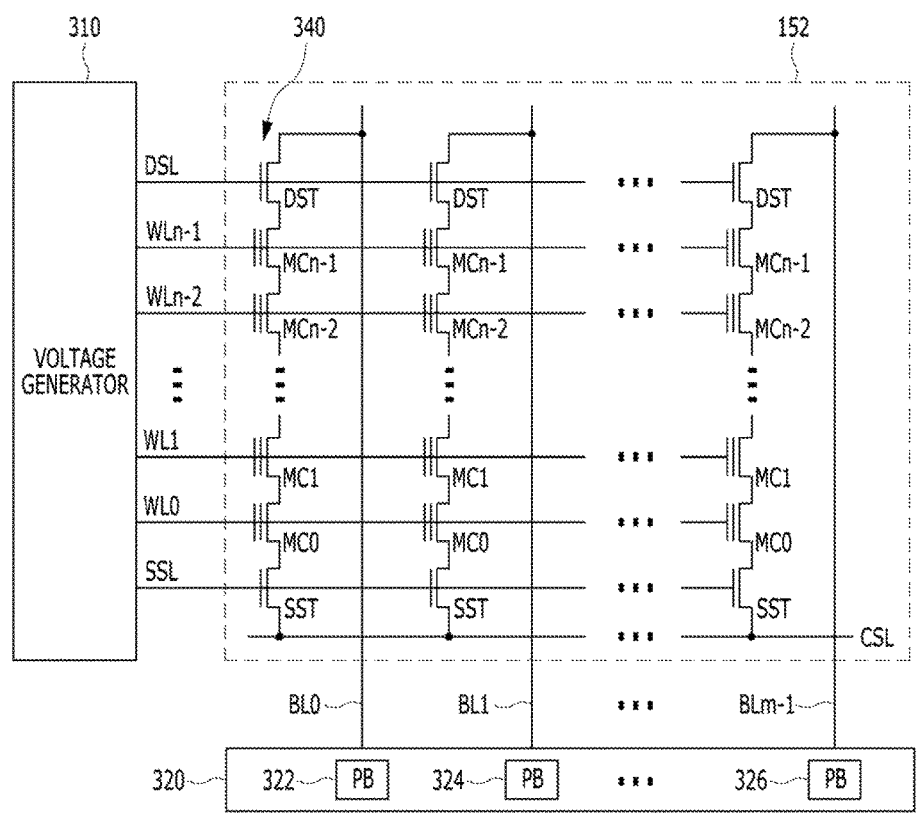
FIG. 3 is a circuit diagram illustrating a memory block in a memory device, according to an embodiment of the present invention.

FIG. 3 is a circuit diagram illustrating one of the plurality of memory blocks 152 to 156 shown in FIG. 1.

Referring to FIG. 3, the memory block 152 of the memory device 150 may include a plurality of cell strings 340 which are electrically coupled to bit lines BL0 to BLm−1 respectively. The cell string 340 of each column may include at least one drain select transistor DST and at least one source select transistor SST. A plurality of memory cells or a plurality of memory cell transistors MCD to MCn−1 may be electrically coupled in series between the select transistors DST and SST. The respective memory cells MC0 to MCn−1 may be configured by multi-level cells (MLC) each of which stores data information of a plurality of bits. The strings 340 may be electrically coupled to the corresponding bit lines BL0 to BLm−1, respectively. For reference, in FIG. 3, 'DSL' denotes a drain select line 'SSL' denotes a source select to line, and 'CSL' denotes a common source line.

While FIG. 3 shows, as an example, the memory block 152 which is configured by NAND flash memory cells, it is to be noted that the memory block 152 of the memory device 150 according to the embodiment is not limited to NAND flash memory and may be realized by NOR flash memory, hybrid flash memory in which at least two kinds of memory cells are combined or one-NAND flash memory in which a controller is built in a memory chip. The operational characteristics of a semiconductor device may be applied to not only a flash memory device in which a charge storing layer is configured by conductive floating gates, however, also a charge trap flash (CTF) in which a charge storing layer is configured by a dielectric layer.

A voltage supply block 310 of the memory device 150 may provide word line voltages, for example, a program voltage, a read voltage and a pass voltage, to be supplied to respective word lines according to an operation mode and voltages to be supplied to bulks, for example, well regions in which the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation the read/write circuit 320 may serve as a write driver which drives bit lines according to data to be stored in the memory cell array. The read/write circuit 320 may receive data to be written in the memory cell array, from a buffer (not shown), during the program operation, and may drive the bit lines according to the inputted data. To this end, the read/write circuit 320 may include a plurality of page buffers 322, 324 and 326 respectively corresponding to columns (or bit lines) or pairs of columns for pairs of bit lines), and a plurality of latches (not shown) may be included in each of the page buffers 322, 324 and 325.

FIGS. 4 to 11 are schematic diagrams illustrating the memory device 150 shown in FIG. 1.

Figure 4:
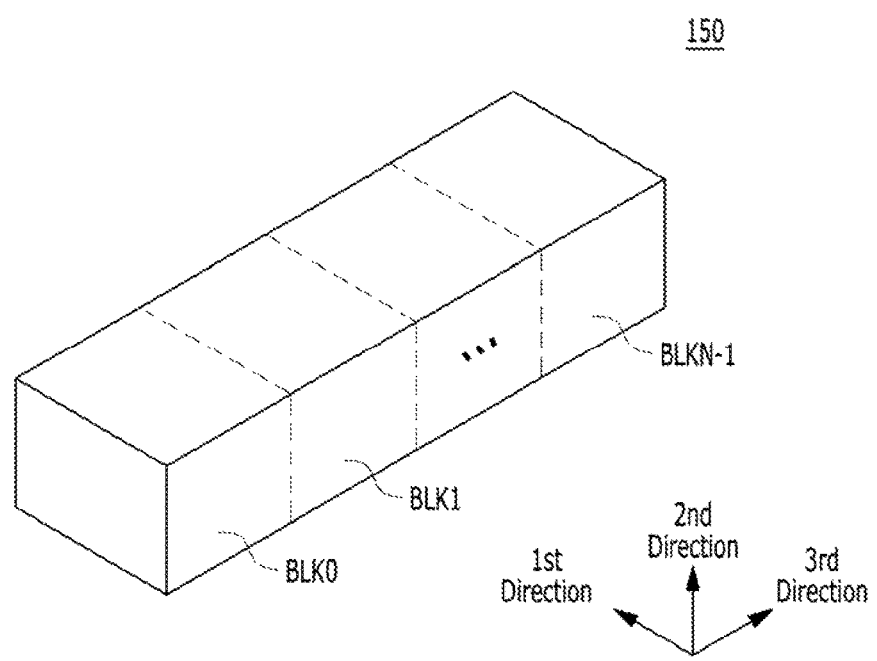
FIGS. 4, 5, 6, 7, 8, 9, 10, and 11 are diagrams schematically illustrating a memory device, according to embodiments of the present invention.

FIG. 4 is a block diagram illustrating an example of the plurality of memory blocks 152 to 156 of the memory device 150 shown in FIG. 1.

Referring to FIG. 4, the memory device 150 may include a plurality of memory blocks BLK0 to BLKN−1, and each of the memory blocks BLK0 to BLKN−1 may be realized in a three-dimensional (3D) structure or a vertical structure. The respective memory blocks BLK0 to BLKN−1 may include structures which extend in first to third directions, for example, an x-axis direction, a y-axis direction and a z-axis direction.

The respective memory blocks BLK0 to BLKN−1 may include a plurality of NAND strings NS which extend in the second direction. The plurality of NAND strings NS may be provided in the first direction and the third direction. Each NAND string NS may be electrically coupled to a bit line BL, at least one source select line SSL, at least one ground select line GSL, a plurality of word lines WL at least one dummy word line DWL, and a common source line CS. Namely, the respective memory blocks BLK0 to BLKN−1 may be electrically coupled to a plurality of bit lines BL, a plurality of source select lines SSL, a plurality of ground select lines GSL, a plurality of word lines WL, a plurality of dummy word lines DWL, and a plurality of common source lines CSL.

Figure 5:
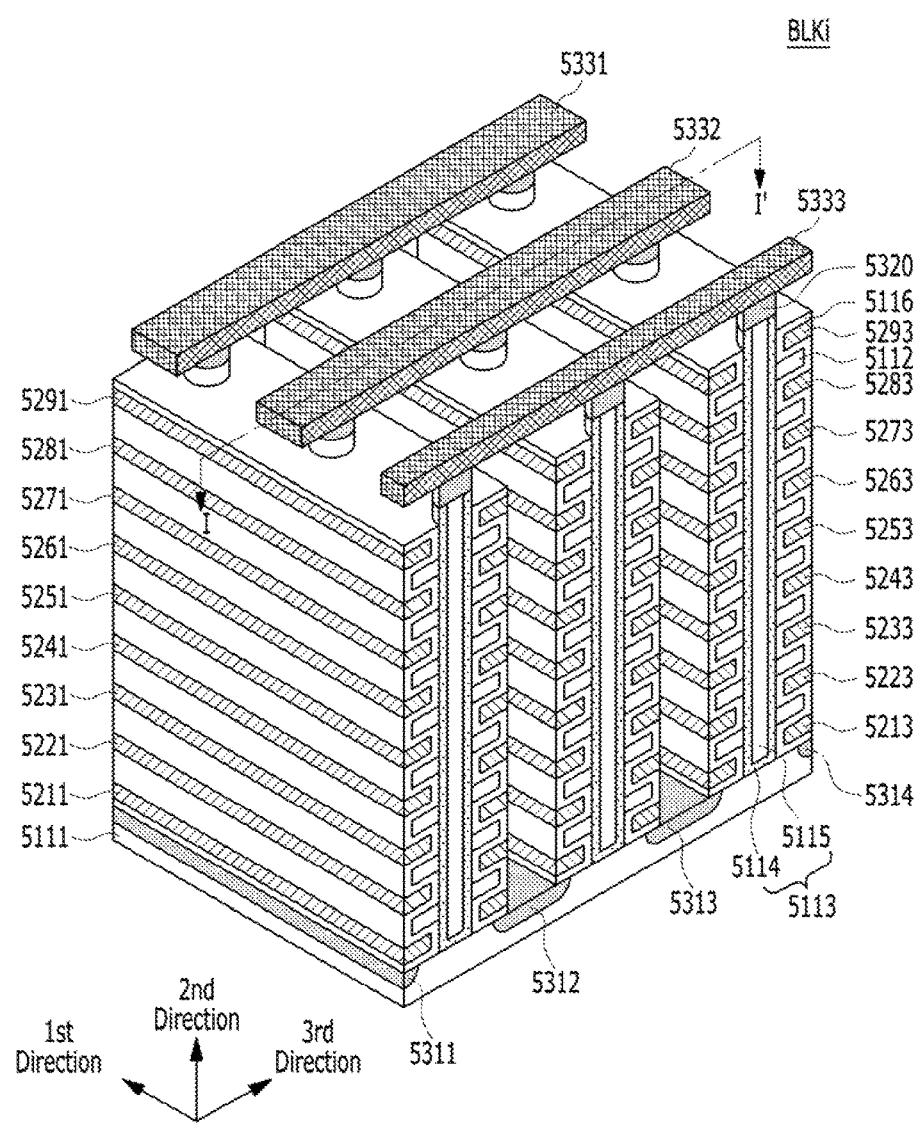
Figure 6:
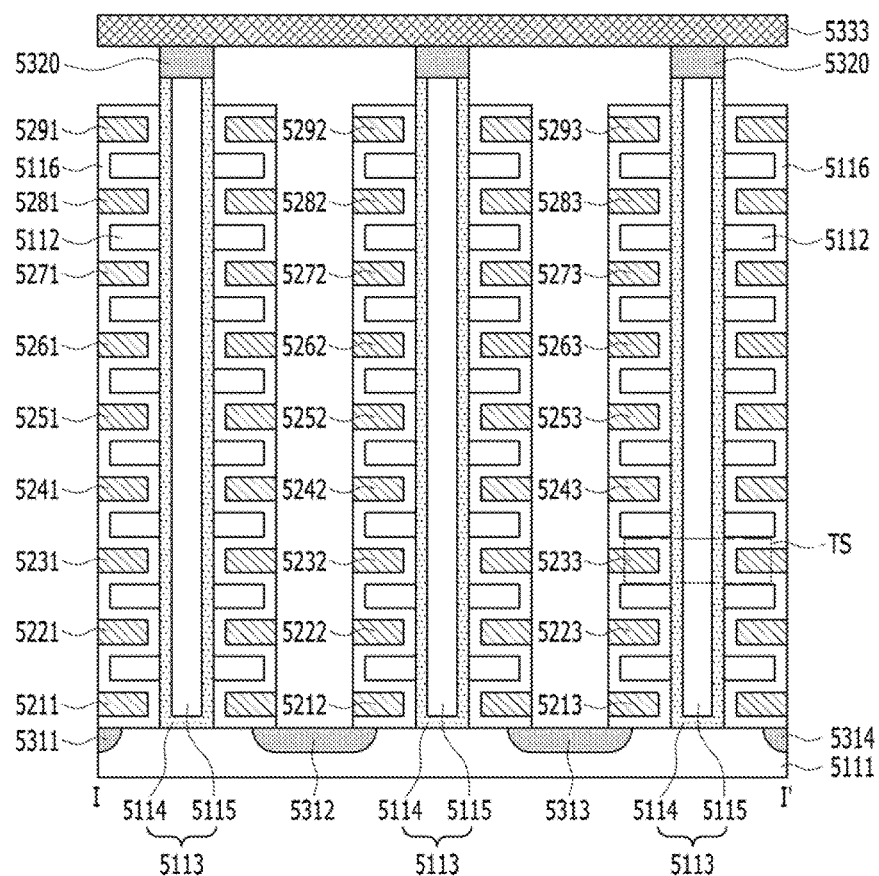

FIG. 5 is a perspective view of one BLKi of the plural memory blocks BLK0 to BLKN−1 shown in FIG. 4. FIG. 6 is a cross-sectional view taken along a line I-I' the memory block BLKi shown in FIG. 5.

Referring to FIGS. 5 and 6, a memory block BLKi among the plurality of memory blocks of the memory device 150 may include a structure which extends in the first to third directions.

A substrate 5111 may be provided. The substrate 5111 may include a silicon material doped with a first type impurity. The substrate 5111 may include a silicon material doped with a p-type impurity or may be a p-type well, for example, a pocket p-well and include an n-type well which surrounds the p-type well. While it is assumed that the substrate 5111 is p-type silicon, it is to be noted that the substrate 5111 is not limited to being p-type silicon.

A plurality of doping regions 5311 to 5314 which extend in the first direction may be provided over the substrate 5111. The plurality of doping regions 5311 to 5314 may contain a second type of impurity that is different from the substrate 5111. The plurality of doping regions 5311 to 5314 may be doped with an n-type impurity. While it is assumed here that first to fourth doping regions 5311 to 5314 are n-type, it is to be noted that the first to fourth doping regions 5311 to 5314 are not limited to being n-type.

In the region over the substrate 5111 between the first and second doping regions 5311 and 5312, a plurality of dielectric materials 5112 which extend in the first direction may be sequentially provided in the second direction. The dielectric materials 5112 and the substrate 5111 may be separated from one another by a predetermined distance in the second direction. The dielectric materials 5112 may be separated from one another by a predetermined distance in the second direction. The dielectric materials 5112 may include a dielectric material such as silicon oxide.

In the region over the substrate 5111 between the first and second doping regions 5311 and 5312, a plurality of pillars 5113 which are sequentially disposed in the first direction and pass through the dielectric materials 5112 in the second direction may be provided. The plurality of pillars 5113 may respectively pass through the dielectric materials 5112 and may be electrically coupled with the substrate 5111. Each pillar 5113 may be configured by a plurality of materials. The surface layer 5114 of each pillar 5113 may include a silicon material doped with the first type of impurity. The surface layer 5114 of each pillar 5113 may include a silicon material doped with the same type of impurity as the substrate 5111. While it is assumed here that the surface layer 5114 of each pillar 5113 may include p-type silicon, the surface layer 5114 of each pillar 5113 is not limited to being p-type silicon.

An inner layer 5115 of each pillar 5113 may be formed of a dielectric material. The inner layer 5115 of each pillar 5113 may be filled by a dielectric material such as silicon oxide.

In the region between the first and second doping regions 5311 and 5312, a dielectric layer 5116 may be provided along the exposed surfaces of the dielectric materials 5112, the pillars 5113 and the substrate 5111. The thickness of the dielectric layer 5116 may be less than half of the distance between the dielectric materials 5112. In other words, a region in which a material other than the dielectric material 5112 and the dielectric layer 5116 may be disposed, may be provided between (i) the dielectric layer 5116 provided over the bottom surface of a first dielectric material of the dielectric materials 5112 and (ii) the dielectric layer 5116 provided over the top surface of a second dielectric material of the dielectric materials 5112. The dielectric to materials 5112 lie below the first dielectric material.

In the region between the first and second doping regions 5311 and 5312, conductive materials 5211 to 5291 may be provided over the exposed surface of the dielectric layer 5116. The conductive material 5211 which extends in the first direction may be provided between the dielectric material 5112 adjacent to the substrate 5111 and the substrate 5111. In particular, the conductive material 5211 which extends in the first direction may be provided between (i) the dielectric layer 5116 disposed over the substrate 5111 and (ii) the dielectric layer 5116 disposed over the bottom surface of the dielectric material 5112 adjacent to the substrate 5111.

The conductive material which extends in the first direction may be provided between (i) the dielectric layer 5116 disposed over the top surface of one of the dielectric materials 5112 and (ii) the dielectric layer 5116 disposed over the bottom surface of another dielectric material of the dielectric materials 5112, which is disposed over the certain dielectric material 5112. The conductive materials 5221 to 5281 which extend in the first direction may be provided between the dielectric materials 5112. The conductive material 5291 which extends in the first direction may be provided over the uppermost dielectric material 5112. The conductive materials 5211 to 5291 which extend in the first direction may be a metallic material. The conductive materials 5211 to 5291 which extend in the first direction may be a conductive material such as polysilicon.

In the region between the second and third doping regions 5312 and 5313, the same structures as the structures between the first and second doping regions 5311 and 5312 may be provided. For example, in the region between the second and third doping regions 5312 and 5313, the plurality of dielectric materials 5112 which extend in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5212 to 5292 which extend in the first direction may be provided.

In the region between the third and fourth doping regions 5313 and 5314, the same structures as between the first and second doping regions 5311 and 5312 may be provided. For example, in the region between the third and fourth doping regions 5313 and 5314, the plurality of dielectric materials 5112 which extend in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5213 to 5293 which extend in the first direction may be provided.

Drains 5320 may be respectively provided over the plurality of pillars 5113. The drains 5320 may be silicon materials doped with second type impurities. The drains 5320 may be silicon materials doped with n-type impurities. While it is assumed for the sake of convenience that the drains 5320 include n-type silicon, it is to be noted that the drains 5320 are not limited to being n-type silicon. For example, the width of each drain 5320 may be larger than the width of each corresponding pillar 5113. Each drain 5320 may be provided in the shape of a pad over the top surface of each corresponding pillar 5113.

Conductive materials 5331 to 5333 which extend in the third direction may be provided over the drains 5320. The conductive materials 5331 to 5333 may be sequentially disposed in the first direction. The respective conductive materials 5331 to 5333 may be electrically coupled with the drains 5320 of corresponding regions. The drains 5320 and the conductive materials 5331 to 5333 which extend in the third direction may be electrically coupled with through contact plugs. The conductive materials 5331 to 5333 which extend in the third direction may be a metallic material. The conductive materials 5331 to 5333 which extend in the third direction may be a conductive material such as polysilicon.

In FIGS. 5 and 6, the respective pillars 5113 may form strings together with the dielectric layer 5116 and the conductive materials 5211 to 5291, 5212 to 5292 and 5213 to 5293 which extend in the first direction. The respective pillars 5113 may form NAND strings NS together with the dielectric layer 5116 and the conductive materials 5211 to 5291, 5212 to 5292 and 5213 to 5293 which extend in the first direction. Each NAND string NS may include a plurality of transistor structures TS.

Figure 7:
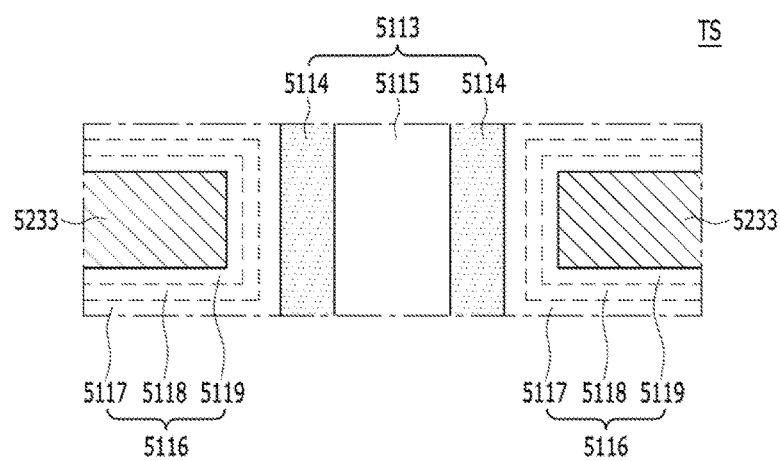

FIG. 7 is a cross-sectional view of the transistor structure TS shown in FIG. 6.

Referring to FIG. 7 in the transistor structure TS shown in FIG. 6, the dielectric layer 5116 may include first to third sub dielectric layers 5117, 5118 and 5119.

The surface layer 5114 of p-type silicon in each of the pillars 5113 may serve as a body. The first sub dielectric layer 5117 adjacent to the pillar 5113 may serve as a tunneling dielectric layer, and may include a thermal oxidation layer.

The second sub dielectric layer 5118 may serve as a charge storing layer. The second sub dielectric layer 5118 may serve as a charge capturing layer, and may include a nitride layer or a metal oxide layer such as an aluminum oxide layer, a hafnium oxide layer, or the like.

The third sub dielectric layer 5119 adjacent to the conductive material 5233 may serve as a blocking dielectric layer. The third sub dielectric layer 5119 adjacent to the conductive material 5233 which extends in the first direction may be formed as a single layer or multiple layers. The third sub dielectric layer 5119 may be a high-k dielectric layer such as an aluminum oxide layer, a hafnium oxide layer, or the like, which has a dielectric constant greater than the first and second sub dielectric layers 5117 and 5118.

The conductive material 5233 may serve as a gate or a control gate. That is, the gate or the control gate 5233, the blocking dielectric layer 5119, the charge storing layer 5118, the tunneling dielectric layer 5117 and the body 5114 may form a transistor or a memory cell transistor structure. For example, the first to third, sub dielectric layers 5117 to 5119 may form an oxide-nitride-oxide (ONO) structure. In the embodiment, for the sake of convenience, the surface layer 5114 of p-type silicon in each of the pillars 5113 will be referred to as a body in the second direction.

The memory block BLKi may include the plurality of pillars 5113. Namely, the memory block BLKi may include the plurality of NAND strings NS. In detail, the memory block BLKi may include the plurality of NAND strings NS which extend in the second direction or a direction perpendicular to the substrate 5111.

Each NAND string NS may include the plurality of transistor structures TS which are disposed in the second direction. At least one of the plurality of transistor structures TS of each NAND string NS may serve as a string source transistor SST. At least one of the plurality of transistor structures TS of each NAND string NS may serve as a ground select transistor GST.

The gates or control gates may correspond to the conductive materials 5211 to 5291, 5212 to 5292 and 5213 to 5293 which extend in the first direction. In other words, the gates or the control gates may extend in the first direction and form word lines and at least two select lines, at least one source select line SSL and at least one ground select line GSL.

The conductive materials 5331 to 5333 which extend in the third direction may be electrically coupled to one end of the NAND strings NS.

The conductive materials 5331 to 5333 which extend in the third direction may serve as bit lines BL. That is, in one memory block BLKi, the plurality of NAND strings NS may be electrically coupled to one bit line BL.

The second type doping regions 5311 to 5314 which extend in the first direction may be provided to the other ends of the NAND strings NS. The second type doping regions 5311 to 5314 which extend in the first direction may serve as common source lines CSL.

Namely, the memory block BLKi may include a plurality of NAND strings NS which extend in a direction perpendicular to the substrate 5111, e.g., the second direction, and may serve as a NAND flash memory block, for example, of a charge capturing type memory in which a plurality of NAND strings NS are electrically coupled to one bit line BL.

While it is illustrated in FIGS. 5 to 7 that the conductive materials 5211 to 5291, 5212 to 5292 and 5213 to 5293 which extend in the first direction are provided in 9 layers, it is to be noted that the conductive materials 5211 to 5291, 5212 to 5292 and 5213 to 5293 which extend in the first direction are not limited to being provided in 9 layers. For example, conductive materials which extend in the first direction may be provided in 8 layers, 16 layers or any multiple of layers. In other words, in one NAND string NS, the number of transistors may be 8, 16 or more.

While it is illustrated in FIGS. 5 to 7 that 3 NAND strings NS are electrically coupled to one bit line BL, it is to be noted that the embodiment is not limited to having 3 NAND strings NS that are electrically coupled to one bit line BL. In the memory block BLKi, m number of NAND strings NS may be electrically coupled to one bit line BL, m being a positive integer. According to the number of NAND strings NS which are electrically coupled to one bit line BL, the number of conductive materials 5211 to 5291, 5212 to 5292 and 5213 to 5293 which extend in the first direction and the number of common source lines 5311 to 5314 may be controlled as well.

Further, while it is illustrated in FIGS. 5 to 7 that 3 NAND strings NS are electrically coupled to one conductive material which extends in the first direction, it is to be noted that the embodiment is not limited to having 3 NAND strings NS electrically coupled to one conductive material which extends in the first direction. For example, n number of NAND strings NS may be electrically coupled to one conductive material which extends in the first direction, n being a positive integer. According to the number of NAND strings NS which are electrically coupled to one conductive material which extends in the first direction, the number of bit lines 5331 to 5333 may be controlled as well.

Figure 8:
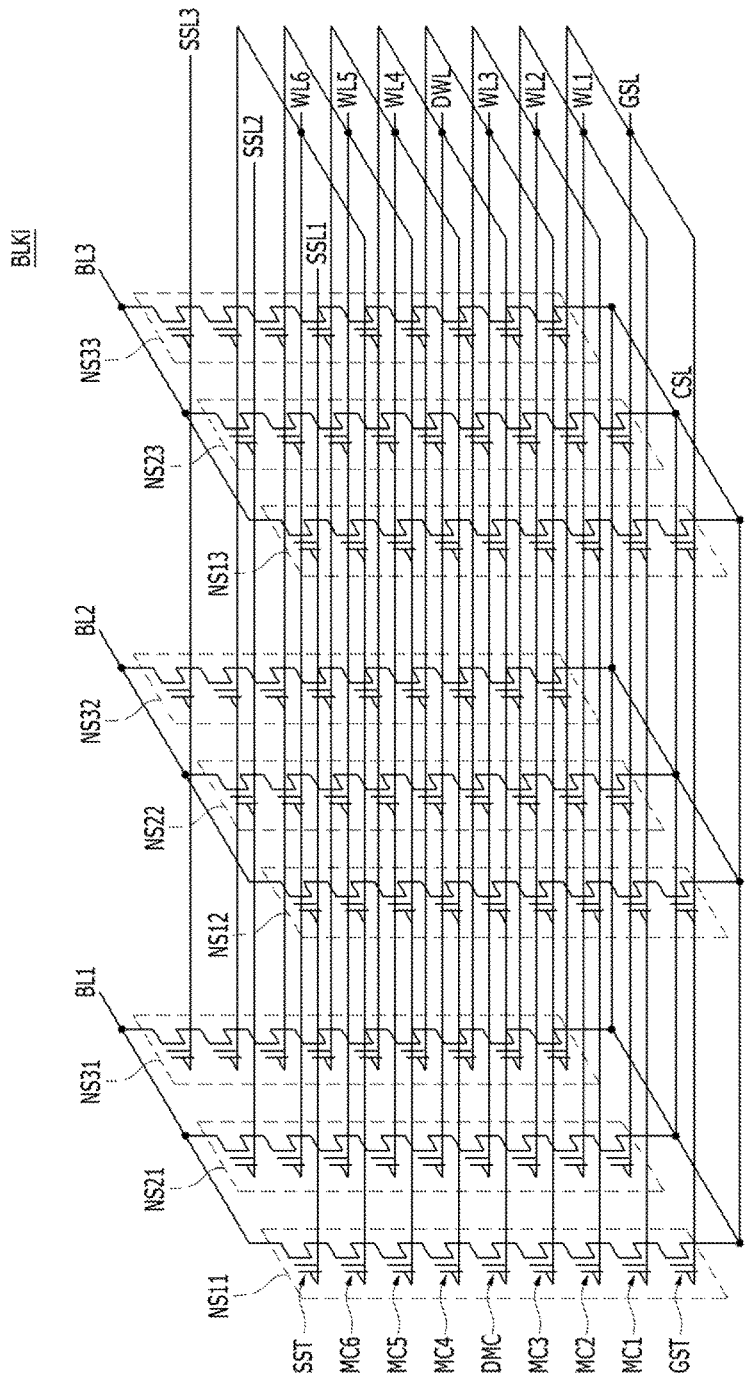

FIG. 8 is an equivalent circuit diagram illustrating the memory block BLKi having a first structure described with reference to FIGS. 5 to 7.

Referring to FIG. 8, in a block BLKi having the first structure, NAND strings NS11 to NS31 may be provided between a first bit line BL1 and a common source line CSL. The first bit line BL1 may correspond to the conductive material 5331 of FIGS. 5 and 6, which extends in the third direction. NAND strings NS12 to NS32 may be provided between a second bit line BL2 and the common source line CSL. The second bit line BL2 may correspond to the conductive material 5332 of FIGS. 5 and 6, which extends in the third direction. NAND strings NS13 to NS33 may be provided between a third bit line BL3 and the common source line CSL. The third bit line BL3 may correspond to the conductive material 5333 of FIGS. 5 and 6, which extends in the third direction.

A source select transistor SST of each NAND string NS may be electrically coupled to a corresponding bit line BL. A ground select transistor GST of each NAND string NS may be electrically coupled to the common source line CSL. Memory cells MC may be provided between the source select transistor SST and the ground select transistor GST of each NAND string NS.

In this example, NAND strings NS may be defined by units of rows and columns and NAND strings NS which are electrically coupled to one bit line may form one column. The NAND strings NS11 to NS31 which are electrically coupled to the first bit line BL1 may correspond to a first column, the NAND strings NS12 to NS32 which are electrically coupled to the second bit line BL2 may correspond to a second column, and the NAND strings NS13 to NS33 which are electrically coupled to the third bit line BL3 may correspond to a third column. NAND strings NS which are electrically coupled to one source select line SSL may form one row. The NAND strings NS11 to NS13 which are electrically coupled to a first source select line SSL1 may form a first row the NAND strings NS21 to NS23 which are electrically coupled to a second source select line SSL2 may form a second row, and the NAND strings NS31 to NS33 which are electrically coupled to a third source select line SSL3 may form a third row.

In each NAND string NS, a height may be defined. In each NAND string NS, the height of a memory cell MC1 adjacent to the ground select transistor GST may have a value '1'. In each NAND string NS, the height of a memory cell may increase as the memory cell gets closer to the source select transistor SST when measured from the substrate 5111. In each NAND string NS, the height of a memory cell MC6 adjacent to the source select transistor SST may be 7.

The source select transistors SST of the NAND strings NS in the same row may share the source select line SSL. The source select transistors SST of the NAND strings NS in different rows may be respectively electrically coupled to the different source select lines SSL1, SSL2 and SSL3.

The memory cells at the same height in the NAND strings NS in the same row may share a word line WL. That is, at the same height, the word lines WL electrically coupled to the memory cells MC of the NAND strings NS in different rows may be electrically coupled. Dummy memory cells DMC at the same height in the NAND strings NS of the same row may share a dummy word line DWL. Namely, at the same height or level, the dummy word lines DWL electrically coupled to the dummy memory cells DMC of the NAND strings NS in different rows may be electrically coupled.

The word lines WL or the dummy word lines DWL located at the same level or height or layer may be electrically coupled with one another at layers where the conductive materials 5211 to 5291, 5212 to 5292 and 5213 to 5293 which extend in the first direction may be provided. The conductive materials 5211 to 5291, 5212 to 5292 and 5213 to 5293 which extend in the first direction may be electrically coupled in common to upper layers through contacts. At the upper layers, the conductive materials 5211 to 5291, 5212 to 5292 and 5213 to 5293 which extend in the first direction may be electrically coupled. In other words, the ground select transistors GST of the NAND strings NS in the same row may share the ground select line GSL. Further, the ground select transistors GST of the NAND strings NS in different rows may share the ground select line GSL. That is, the NAND strings NS11 to NS13, NS21 to NS23 and NS31 to NS33 may be electrically coupled to the ground select line GSL.

The common source line CSL may be electrically coupled to the NAND strings NS. Over the active regions and over the substrate 5111, the first to fourth doping regions 5311 to 5314 may be electrically coupled. The first to fourth doping regions 5311 to 5314 may be electrically coupled to an upper layer through contacts and, at the upper layer, the first to fourth doping regions 5311 to 5314 may be electrically coupled.

Namely, as shown in FIG. 8, the word lines WL of the same height or level may be electrically coupled. Accordingly, when a word line WL at a specific height is selected, all NAND strings NS which are electrically coupled to the word line WL may be selected. The NAND strings NS in different rows may be electrically coupled to different source select lines SSL. Accordingly, among the NAND strings NS electrically coupled to the same word line WL, by selecting one of the source select lines SSL1 to SSL3, the NAND strings NS in the unselected rows may be electrically isolated from the bit lines BL1 to BL3. In other words, by selecting one of the source select lines SSL1 to SSL3, a row of NAND strings NS may be selected. Moreover, by selecting one of the bit lines BL1 to BL3, the NAND strings NS in the selected rows may be selected in units of columns.

In each NAND string NS, a dummy memory cell DMC may be provided. In FIG. 8, the dummy memory cell DMC may be provided between a third memory cell MC3 and a fourth memory cell MC4 in each NAND string NS. That is, first to third memory cells MC1 to MC3 may be provided between the dummy memory cell DMC and the ground select transistor GST. Fourth to sixth memory cells MC4 to MC6 may be provided between the dummy memory cell DMC and the source select transistor SST. The memory cells MC of each NAND string NS may be divided into memory cell groups by the dummy memory cell DMC. In the divided memory cell groups, memory cells, for example, MC1 to MC3, adjacent to the ground select transistor GST may be referred to as a lower memory cell group, and memory cells, for example, MC4 to MC6, adjacent to the string select transistor SST may be referred to as an upper memory cell group.

Hereinbelow, detailed descriptions will be made with reference to FIGS. 9 to 11, which show the memory device in the memory system according to an embodiment implemented with a three-dimensional (3D) nonvolatile memory device different from the first structure.

Figure 9:
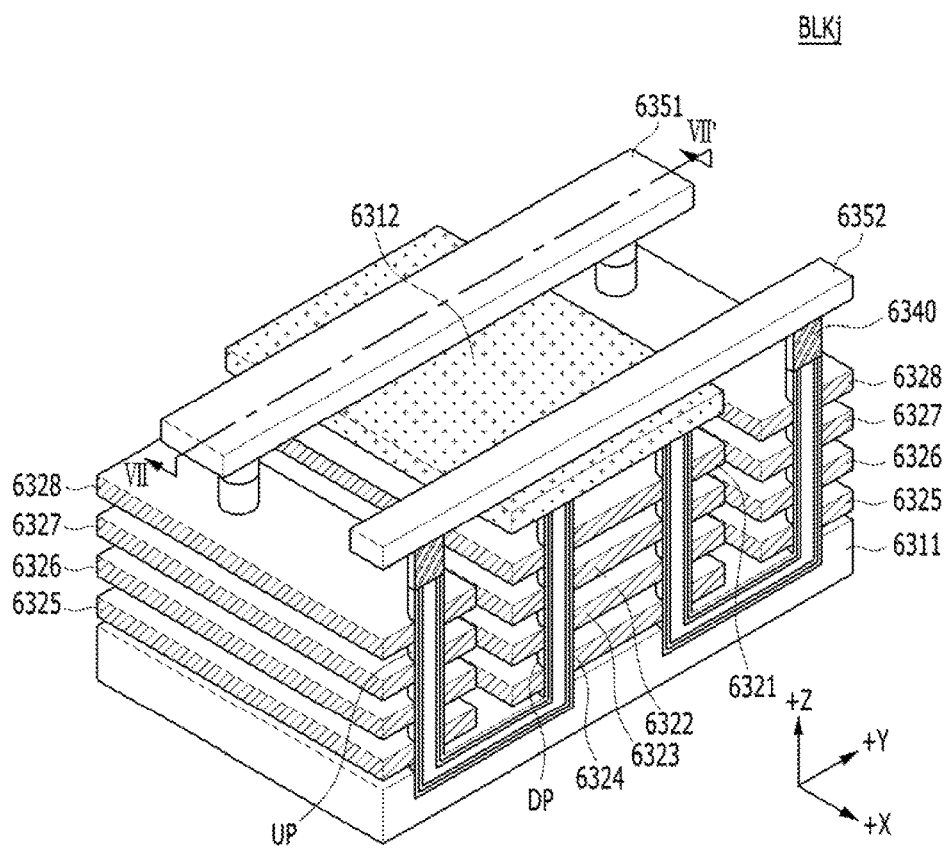

FIG. 9 is a perspective view schematically illustrating the memory device implemented with the three-dimensional (3D) nonvolatile memory device, which is different from the first structure described above with reference to FIGS. 5 to 8, and showing a memory block BLKj of the plurality of memory blocks of FIG. 4. FIG. 10 is a cross-sectional view illustrating the memory block BLKj taken along the line of FIG. 9.

Figure 10:
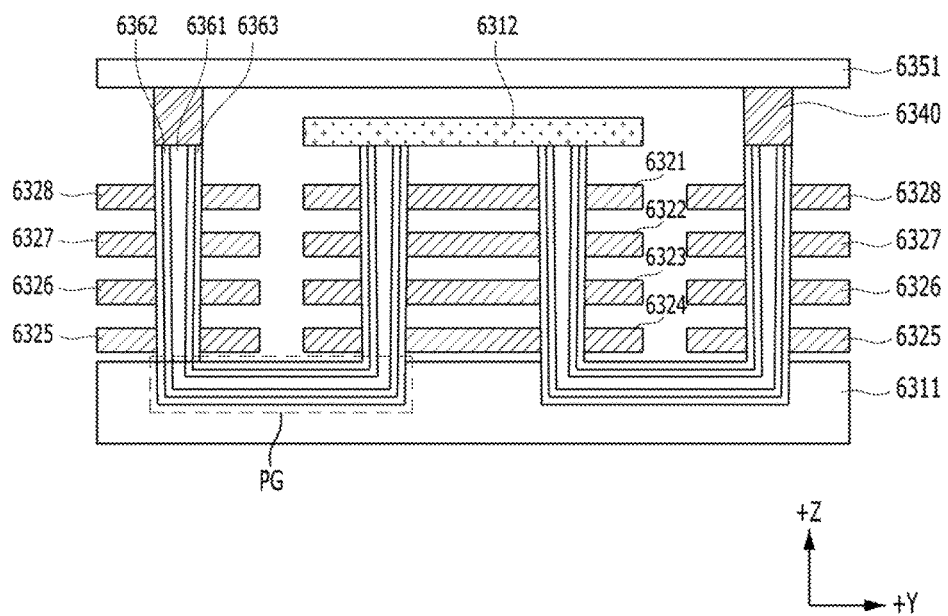

Referring to FIGS. 9 and 10, the memory block BLKj among the plurality of memory blocks of the memory device 150 of FIG. 1 may include structures which extend in the first to third directions.

A substrate 6311 may be provided. For example, the substrate 6311 may include a silicon material doped with a first type impurity. For example, the substrate 6311 may include a silicon material doped with a p-type impurity or may be a p-type well, for example, a pocket p-well, and include an n-type well which surrounds the p-type well. While it is assumed in the embodiment for the sake of convenience that the substrate 6311 is p-type silicon, it is to be noted that the substrate 6311 is not limited to being p-type silicon.

First to fourth conductive materials 6321 to 6324 which extend in the x-axis direction and the y-axis direction are provided over the substrate 6311. The first to fourth conductive materials 6321 to 6324 may be separated by a predetermined distance in the z-axis direction.

Fifth to eighth conductive materials 6325 to 6328 which extend in the x-axis direction and the y-axis direction may be provided over the substrate 6311. The fifth to eighth conductive materials 6325 to 6328 may be separated by the predetermined distance in the z-axis direction. The fifth to eighth conductive materials 6325 to 6328 may be separated from the first to fourth conductive materials 6321 to 6324 in the y-axis direction.

A plurality of lower pillars DP which pass through the first to fourth conductive materials 6321 to 6324 may be provided. Each to lower pillar DP extends in the z-axis direction. Also, a plurality of upper pillars UP which pass through the fifth to eighth conductive materials 6325 to 6328 may be provided. Each upper pillar UP extends in the z-axis direction.

Each of the lower pillars DP and the upper pillars UP may include an internal material 6361, an intermediate layer 6362, and a surface layer 6363. The intermediate layer 6362 may serve as a channel of the cell transistor. The surface layer 6363 may include a blocking dielectric layer, a charge storing layer and a tunneling dielectric layer.

The lower pillar DP and the upper pillar UP may be electrically coupled through a pipe gate PG. The pipe gate PG may be disposed in the substrate 6311. For instance, the pipe gate PG may include the same material as the lower pillar DP and the upper pillar UP.

A doping material 6312 of a second type which extends in the x-axis direction and the y-axis direction may be provided over the lower pillars DP. For example the doping material 6312 of the second type may include an n-type silicon material. The doping material 6312 of the second type may serve as a common source line CSL.

Drains 6340 may be provided over the upper pillars UP. The drains 6340 may include an n-type silicon material. First and second upper conductive materials 6351 and 6352 which extend in the y-axis direction may be provided over the drains 6340.

The first and second upper conductive materials 6351 and 6352 may be separated in the x-axis direction. The first and second upper conductive materials 6351 and 6352 may be formed of a metal. The first and second upper conductive materials 6351 and 6352 and the drains 6340 may be electrically coupled through contact plugs. The first and second upper conductive materials 6351 and 6352 respectively serve as first and second bit lines BL1 and BL2.

The first conductive material 6321 may serve as a source select line SSL, the second conductive material 6322 may serve as a first dummy word line DWL1, and the third and fourth conductive materials 6323 and 6324 serve as first and second main word lines MWL1 and MWL2 respectively. The fifth and sixth conductive materials 6325 and 6326 serve as third and fourth main word lines MWL3 and MWL4, respectively, the seventh conductive material 6327 may serve as a second dummy word line DWL2, and the eighth conductive material 6328 may serve as a drain select line DSL.

The lower pillar DP and the first to fourth conductive materials 6321 to 6324 adjacent to the lower pillar DP form a lower string. The upper pillar UP and the fifth to eighth conductive materials 6325 to 6328 adjacent to the upper pillar UP form an upper string. The lower string and the upper string may be electrically coupled through the pipe gate PG. One end of the lower string may be electrically coupled to the doping material 6312 of the second type which serves as the common source line CSL. One end of the upper string may be electrically coupled to a corresponding bit line through the drain 6340. One lower string and one upper string form one cell string which is electrically coupled between the doping material 6312 of the second type serving as the common source line CSL and a corresponding one of the upper conductive material layers 6351 and 6352 serving as the bit line BL.

That is, the lower string may include a source select transistor SST, the first dummy memory cell DMC1, and the first and second main memory cells DMC1 and MMC2. The upper string may include the third and fourth main memory cells MMC3 and MMC4, the second dummy memory cell DMC2, and a drain select transistor DST.

In FIGS. 9 and 10, the upper string and the lower string may form a NAND string NS, and the NAND string NS may include a plurality of transistor structures TS. Since the transistor structure included in the NAND string NS in FIGS. 9 and 10 is described above in detail with reference to FIG. 7, a detailed description thereof will be omitted herein.

Figure 11:
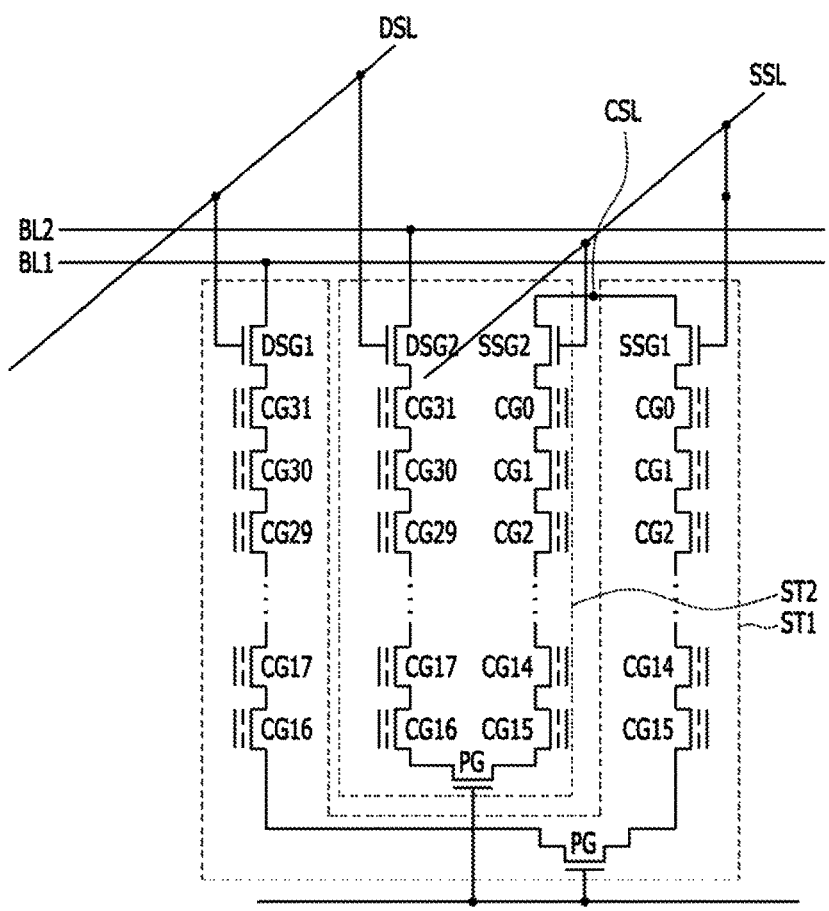

FIG. 11 is a circuit diagram illustrating the equivalent circuit of the memory block BLKj having the second structure as described above with reference to FIGS. 9 and 10. For the sake of convenience, only a first string and a second string, which form a pair in the memory block BLKj in the second structure are shown.

Referring to FIG. 11, in the memory block BLKj having the second structure among the plurality of blocks of the memory device 150, cell strings, each of which is implemented with one upper string and one lower string electrically coupled through the pipe gate PG as described above with reference to FIGS. 9 and 10, may be provided in such a way as to define a plurality of pairs.

Namely, in the certain memory block BLKj having the second structure, memory cells CG0 to CG31 stacked along a first channel CH1 (not shown), for example, at least one source select gate SSG1 and at least one drain select gate DSG1 may form a first string ST1, and memory cells CG0 to CG31 stacked along a second channel CH2 (not shown), for example, at least one source select gate SSG2 and at least one drain select gate DSG2 may form a second string ST2.

The first string ST1 and the second string ST2 may be electrically coupled to the same drain select line DSL and the same source select line SSL. The first string ST1 may be electrically coupled to a first bit line BL1, and the second string ST2 may be electrically coupled to a second bit line BL2.

While it is described in FIG. 11 that the first string ST1 and the second string ST2 are electrically coupled to the same drain select line DSL and the same source select line SSL, it may be envisaged that the first string ST1 and the second string ST2 may be electrically coupled to the same source select line SSL and the same bit line BL, the first string ST1 may be electrically coupled to a first drain select line DSL1 and the second string ST2 may be electrically coupled to a second drain select line DSL2. Further it may be envisaged that the first string ST1 and the second string ST2 may be electrically coupled to the same drain select line DSL and the same bit line BL, the first string ST1 may be electrically coupled to a first source select line SSL1 and the second string ST2 may be electrically coupled a second source select line SSL2.

Figure 12A:
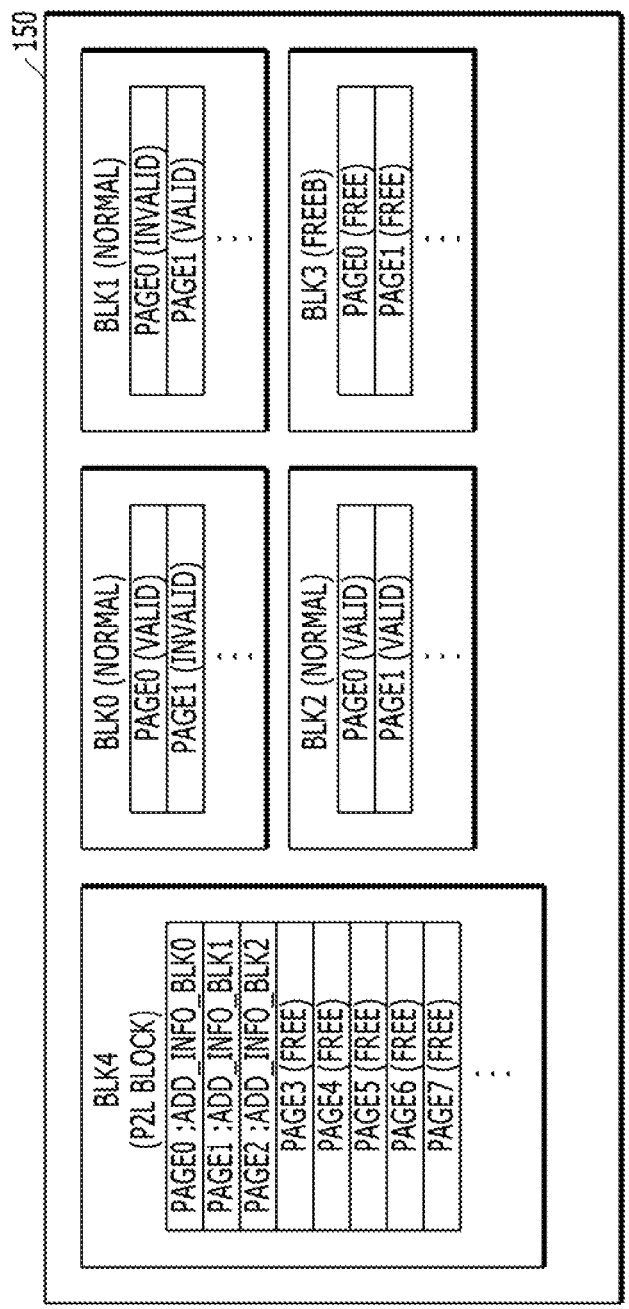
FIGS. 12A to 12E are diagrams illustrating a management operation of a mapping block in a memory system according to an embodiment of the present invention.

Referring now to FIGS. 12A to 12E a mapping operation is provided, according to embodiments of the present invention. More specifically, in reference to FIG. 12A, it can be understood that the configuration of the memory device 150 of the memory system 110 of FIG. 1 is illustrated herein in more detail. Accordingly the memory device 150 may include a plurality of memory blocks BLK0 to BLK4. Each of the plurality of memory blocks BLK0 to BLK4 may include a plurality of pages, for example pages PAGE0 to PAGE7. FIG. 12A, for convenience, illustrates that the memory device 150 may include five memory blocks BLK0 to BLK4 as the plurality of memory blocks. However, it is noted that any number of memory blocks may be included in the memory device 150. For example, a larger number of memory blocks may be included in the memory device 150.

Although not illustrated in FIG. 12A, the controller 130 illustrated in FIG. 1 may classify the plurality of memory blocks BLK0 to BLK4 included in the memory device 150 into a mapping block P2L BLOCK, a free block FREEB and a plurality of normal blocks NORMAL. Hence, other than a block which is classified as a mapping block and a free block, all remaining blocks may be classified as normal. The controller may manage the plurality of memory blocks BLK0 to BLK4. According to the embodiment illustrated in FIG. 12A, the fourth block BLK4 may be selected as the mapping block P2L BLOCK, whereas the remaining blocks, except for the third block BLK3 which is a free block FREEB, i.e., blocks BLK0 to BLK2 may be classified as normal blocks NORMAL. This example, in which the controller 130 selects one block BLK4 among the plurality of memory blocks BLK0 to BLK4 as the mapping block P2L BLOCK, is an example. It is noted, that two or more blocks may be selected as the mapping block P2L BLOCK.

Some of the plurality of pages PAGE0 to PAGE7 included in the mapping block P2L BLOCK may store address information ADD_INFO_BLK0 to ADD_INFO_BLK2 corresponding to the normal blocks NORMAL. That is, the $0^{th}$ h page PAGE0 of the mapping block P2L BLOCK may store the $0^{th}$ address information ADD_INFO_BLK0 for indicating the $0^{th}$ block BLK0 of the normal blocks BLK0 to BLK3. Likewise, the first page PAGE1 of the mapping block P2L BLOCK may store the first address information ADD_INFO_BLK1 for indicating the first block BLK1 of the normal blocks BLK0 to BLK3, and the second page PAGE2 of the mapping block P2L BLOCK may store the second address information ADD_INFO_BLK2 for indicating the second block BLK2 of the normal blocks BLK0 to BLK3.

The other pages PAGE3 to PAGE7, . . . , of the mapping block P2L BLOCK may be free pages FREE. This may be because, it is assumed that the plurality of memory blocks included in the memory device 150 are total five blocks BLK0 to BLK4, and among them, three blocks BLK0 to BLK2, except for the mapping block P2L BLOCK and the free block FREEB, are the normal blocks NORMAL. In other words, address information for each normal block may be stored in a single page of the mapping block P2L BLOCK. Hence, for example, if n blocks of the memory device are normal blocks, then n pages of the mapping block P2L block may be employed to store address information for the corresponding n normal blocks, wherein n may be 0 or a positive integer.

The address information ADD_INFO_BLK0 to ADD_INFO_BLK2 may be information for mapping physical block addresses (not illustrated) and physical page addresses not illustrated) with logic addresses (not illustrated) used in the host 102. The physical block addresses may represent addresses for respectively selecting the $0^{th}$ to second blocks BLK0 to BLK2 classified into the normal blocks NORMAL. Furthermore the physical page addresses may represent addresses for selecting valid pages VALID included in each of the $0^{th}$ to second blocks BLK0 to BLK2 classified as normal blocks NORMAL.

For example, the $0^{th}$ address information ADD_INFO_BLK0 stored in the $0^{th}$ page PAGE0 of the fourth block BLK4 (the mapping table P2L) may include a physical block address for selecting the $0^{th}$ block BLK0 from the normal blocks NORMAL and a physical page address for selecting the $0^{th}$ page PAGE0 (VALID) included in the $0^{th}$ block BLK0. Furthermore, the first address information ADD_INFO_BLK1 stored in the first page PAGE1 of the fourth block BLK4 (the mapping table P2L) may include a physical block address for selecting the first block BLK1 from the normal blocks NORMAL and a physical page address for selecting the first page PAGE1 (VALID) included in the first block BLK1. Furthermore, the second address information ADD_INFO_BLK2 stored in the second page PAGE2 of the fourth block BLK4 (the mapping table P2L) may include a physical block address for selecting the second block BLK2 from the normal blocks NORMAL and two physical page addresses for respectively selecting the $0^{th}$ page PAGE0 (VALID) and the first page PAGE1 (VALID) included in the second block BLK2.

In this way, referring to the $0^{th}$ to second address information ADD_INFO_BLK0 to ADD_INFO_BLK2 stored in the $0^{th}$ to second pages PAGE0 to PAGE2 included in the mapping block P2L BLOCK, allows to respectively select the $0^{th}$ to second blocks BLK0 to BLK2 of the normal blocks NORMAL, and to select the plurality of pages PAGE0, PAGE1 which are respectively included in the $0^{th}$ to second blocks BLK0 to BLK2 In other words, the address information stored in the pages of the mapping block may allow selection of each of the plurality of pages of each of the normal blocks.

Figure 12B:
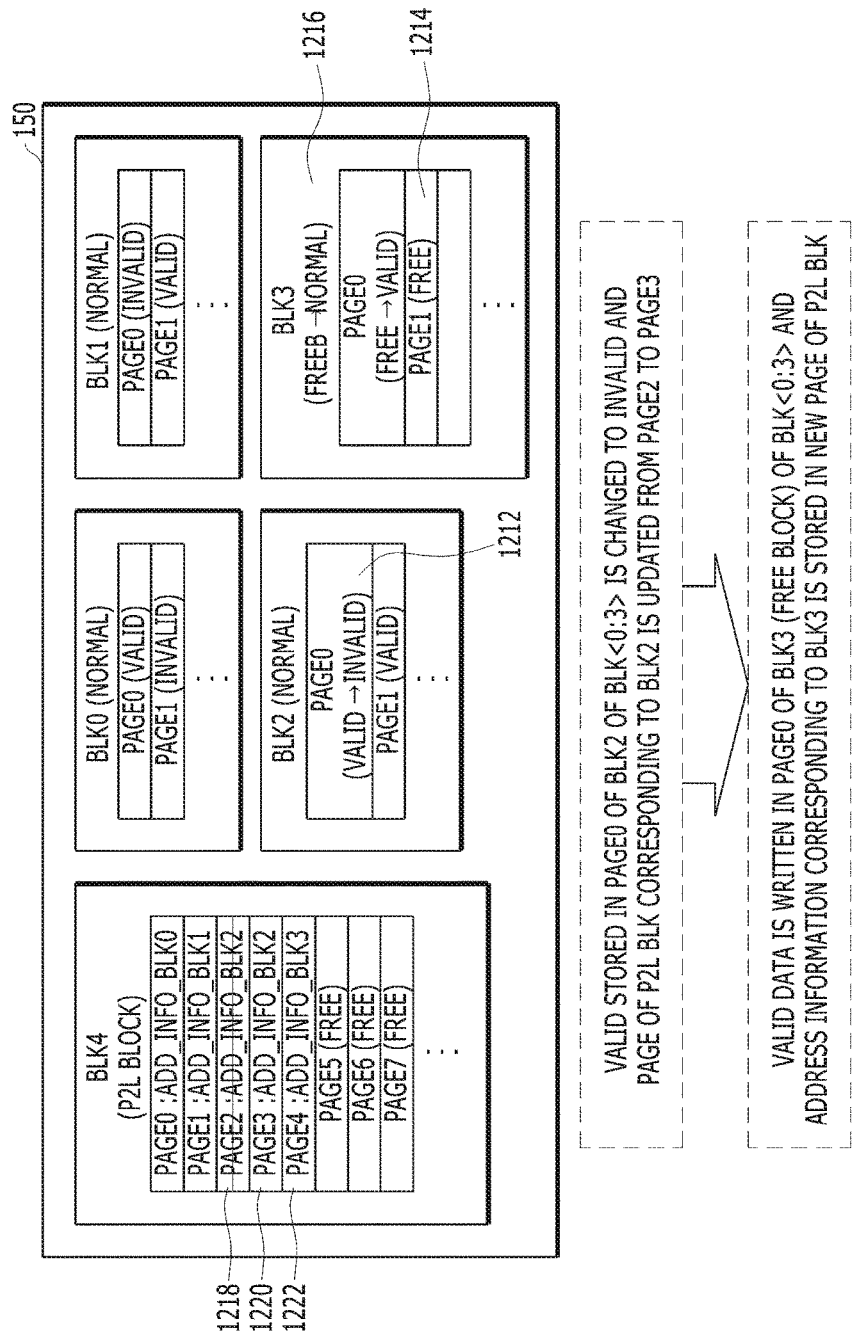

Referring now to FIG. 12B, an update method of the address information stored in the mapping block is provided according to an embodiment of the invention. More specifically, an update method of the address information ADD_INFO_BLK0 to ADD_INFO_BLK2 stored in the mapping block P2L BLOCK of the memory device 150 is provided.

As described in reference to FIG. 1, the memory device 150 may be a nonvolatile memory device, hence, a read/write operation is possible for each of the plurality of pages PAGE0, PAGE1, . . . , included in the mapping block P2L BLOCK. However, an erase operation may not be performed on a page unit level and may only be performed on a block unit level.

In the illustrated example of FIG. 12B, when the state of data stored in any one of the $0^{th}$ to second blocks BLK0 to BLK2 included in the normal blocks NORMAL is updated, the address information ADD_INFO_BLK0 to ADD_INFO_BLK2 corresponding to the normal blocks in update targets should also be updated.

For example as illustrated in FIG. 12B, since the value of valid data VALID stored in the $0^{th}$ page PAGE0 of the second block BLK2 should be changed, an operation may be performed for invalidating the valid data VALID into invalid data INVALID (1212) and for re-writing the changed data in the $0^{th}$ page PAGE0 (a free page FREE) of the third block BLK3 (the free block FREEB) (1214). That is, it can be understood that the state of data stored in all the second block BLK2 and the third block BLK3 may be updated. Particularly, it can be understood that the third block BLK3 (the free block FREEB) may be added for the first time to the normal blocks NORMAL (1216).

Accordingly, the second address information ADD_INFO_BLK2 stored in the second page PAGE2 of the mapping block P2L BLOCK corresponding to the second block BLK2 before the update may be validated (1218), and a new second address information ADD_INFO_BLK2 corresponding to the second block BLK2 after the update may be stored in the third page PAGE3 of the mapping block P2L BLOCK in a free page FREE state (1220).

Then, since new data is stored in the $0^{th}$ page PAGE0 of the third block BLK3, the third block BLK3 which was a free block FREEB may now be classified as a normal block NORMAL. Further, the third address information ADD_INFO_BLK3 corresponding to the third block BLK3 may be stored in the fourth page PAGE4 of the mapping block. P2L BLOCK in the free page FREE state (1222).

As described above, due to the operational characteristics of the nonvolatile memory device 150, an individual erase operation for each of the address information ADD_INFO_BLK0 to ADD_INFO_BLK2 stored in plurality of pages PAGE0, PAGE1, etc., included in the mapping block P2L BLOCK is not possible. However, an operation for invalidating an invalid value may be performed.

Accordingly, a garbage collection operation may be performed for the mapping block P2L BLOCK, similarly to a garbage collection operation performed for the normal blocks NORMAL. For example, in reference to FIG. 12B, when data stored in the normal blocks NORMAL is updated and the number of invalidated address information of the address information ADD_INFO_BLK0 to ADD_INFO_BLK2 stored in the mapping block P2L BLOCK is increased, a garbage collection operation may also be performed for the mapping block P2L BLOCK at an appropriate time point, similarly to the case in which the garbage collection operation is performed for the normal blocks NORMAL. That is, a garbage collection operation for the mapping block may be performed using the same criteria used for a garbage collection operation performed for the normal blocks.

However, there is a difference between a garbage collection operation for the normal blocks NORMAL and a garbage collection operation for the mapping block P2L BLOCK.

In a garbage collection operation for the normal blocks NORMAL, data stored in valid pages VALID may be collected from a plurality of blocks and stored in one free block FREEB. The number of blocks from which data may be collected during a garbage operation for the normal blocks may be equal or less than a preset number.

In a garbage collection operation for the mapping block P2L BLOCK, a free block FREEB may be set as a new mapping block P2L BLOCK and then only valid address information of a mapping block P2L BLOCK selected as a victim block may be copied in the new mapping block P2L BLOCK. For example, valid address information stored in the mapping block P2L BLOCK may only be moved to a newly designated mapping block P2L BLOCK through a garbage collection operation, and may not be moved to other blocks generated for the garbage collection operation for normal blocks NORMAL. Moreover, it should be understood, that data of valid pages VALID which are moved in the garbage collection operation for normal blocks NORMAL may not be moved to a newly designated mapping block P2L, BLOCK for the garbage collection operation for a mapping block P2L, BLOCK.

Meanwhile, there may occur a case in which some of the address information ADD_INFO_BLK0 to ADD_INFO_BLK2 stored in the mapping block P2L BLOCK substantially and continuously maintain a valid state, however, its values do not actually have any meaning. In a first case, an operation for updating data stored in a specific normal block may include invalidating all pages of a corresponding specific block. That is, as a result obtained by updating the data stored in the specific block, when all pages included in the corresponding specific block are invalidated, it may not be necessary to access the corresponding specific block before the garbage collection operation is performed for the corresponding specific block, the corresponding specific block is changed to a free block FREEB, and new data is written. However, when updating the data stored in the specific block, the address information of the mapping block P2L BLOCK stored in a valid state substantially and continuously maintains a valid state.

A second case is an operation before a specific normal block NORMAL including some valid data is changed to a free block FREEB through a garbage collection operation and then new data is written again. That is, it is not necessary to access a specific normal block, before the garbage collection operation is performed for the specific normal block, the specific normal block is changed to a free block FREEB, and the new data is re-written in a corresponding specific block. However, the address information of the mapping block P2L BLOCK for the corresponding specific block stored in a valid state before the garbage collection operation is performed for the specific block substantially and continuously maintains the valid state.

As described above, although some address information stored in the mapping block P2L BLOCK is not substantially used, since unnecessary valid address information substantially and continuously maintaining the valid state is determined to be continuously valid when the garbage collection operation is performed for the mapping block P2L BLOCK, it is copied into a free block FREEB. Since this corresponds to an operation for copying unnecessary valid address information not to be used into other blocks, it may be regarded as very inefficient operation.

Figure 12C:
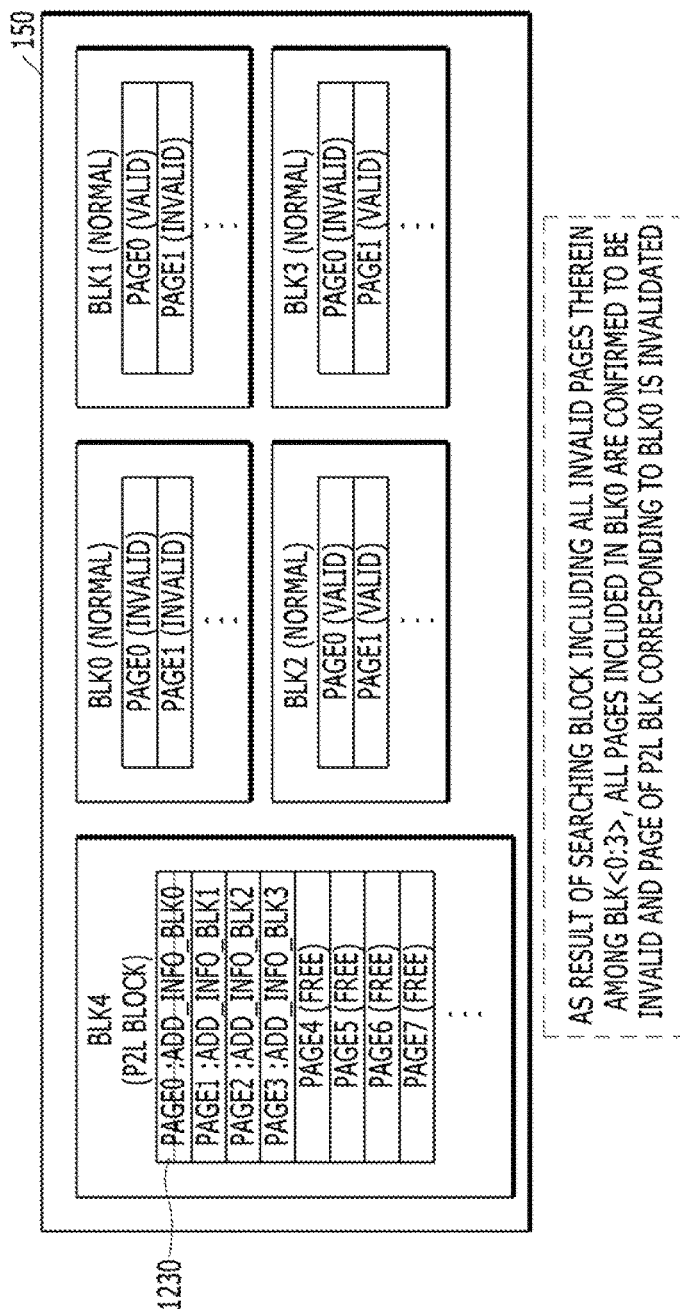
Figure 12D:
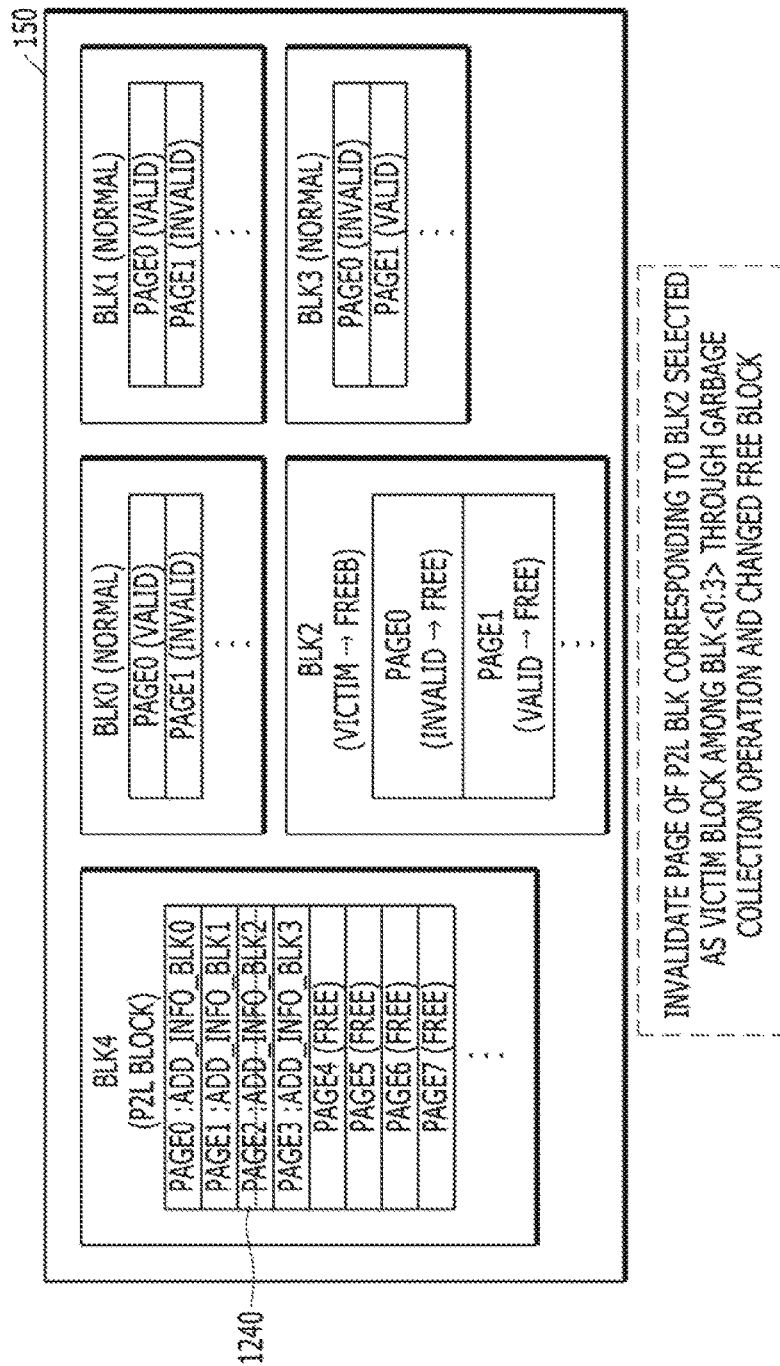

In this regard, the memory system 110, according to an embodiment of the present invention, may prevent unnecessary address information in the mapping block P2L BLOCK from maintaining a valid state through an operation illustrated in FIGS. 12C and 12D. Specifically, the operation includes searching for a normal block NORMAL which does not include any valid pages VALID and invalidating pages of the mapping block P2L BLOCK storing address information corresponding to the searched block.

Referring to FIG. 12C, it can be understood that an operation for searching for a block which does not include any valid pages VALID from the $0^{th}$ to third blocks BLK0 to BLK3 included in normal blocks NORMAL and invalidating pages of the mapping block P2L BLOCK storing address information corresponding to the searched block has been started.

For example, as illustrated in FIG. 12C, it may be assumed that among the $0^{th}$ to third blocks BLK0 to BLK3 included in normal blocks NORMAL, a plurality of pages PAGE0, PAGE1, . . . , included in the $0^{th}$ block BLK0 are all invalid pages INVALID and one or more valid pages VALID exist in a plurality of pages PAGE0, PAGE1, . . . , included in the first to third blocks BLK1 to BLK3. Accordingly, when a block which does not include any valid pages VALID is searched for among the $0^{th}$ to third blocks BLK0 to BLK3 included in normal blocks NORMAL, the $0^{th}$ block BLK0 may be determined to be such a block.

As a result of the search, $0^{th}$ address information ADD_INFO_BLK0 of a mapping block P2L BLOCK (BLK4 corresponding to the $0^{th}$ block BLK0 confirmed not to include any valid pages VALID may be invalidated (1230).

An operation for searching whether each of the normal blocks NORMAL may not include any valid pages VALID may be a simple operation for confirming counting information of valid pages VALID of each of the normal blocks NORMAL. However, such searching operation may influence a normal operation performed between the controller 130 and the memory device 150, such as a read, write, and or erase operation. Accordingly, in an embodiment of the present invention, when the memory device 150 is not in a busy state, an operation for searching whether each of normal blocks NORMAL may not include any valid pages VALID may be repeated at preset regular time intervals.

Referring to FIG. 12D, it can be understood that an operation for invalidating pages of a mapping block P2L BLOCK storing address information corresponding to a block selected as a victim block VICTIM through the garbage collection operation among the normal blocks NORMAL and then changed to a free block FREEB has been started.

For example, as illustrated in FIG. 12D, among the $0^{th}$ to third blocks BLK0 to BLK3 included in the normal blocks NORMAL, the second block BLK2 may be selected as the victim block VICTIM through the garbage collection operation and changed to the free block FREEB. Accordingly, the second page PAGE2 of a mapping block P2L BLOCK storing second address information ADD_INFO_BLK2 corresponding to the second block BLK2 changed to the free block FREEB is invalidated (1240).

As described above, an operation for invalidating pages of a mapping block P2L BLOCK storing address information corresponding to a block changed to the free block FREEB in the normal blocks NORMAL according to the garbage collection operation may be included as the final operation of the garbage collection operation and may be performed therewith.

Figure 12E:
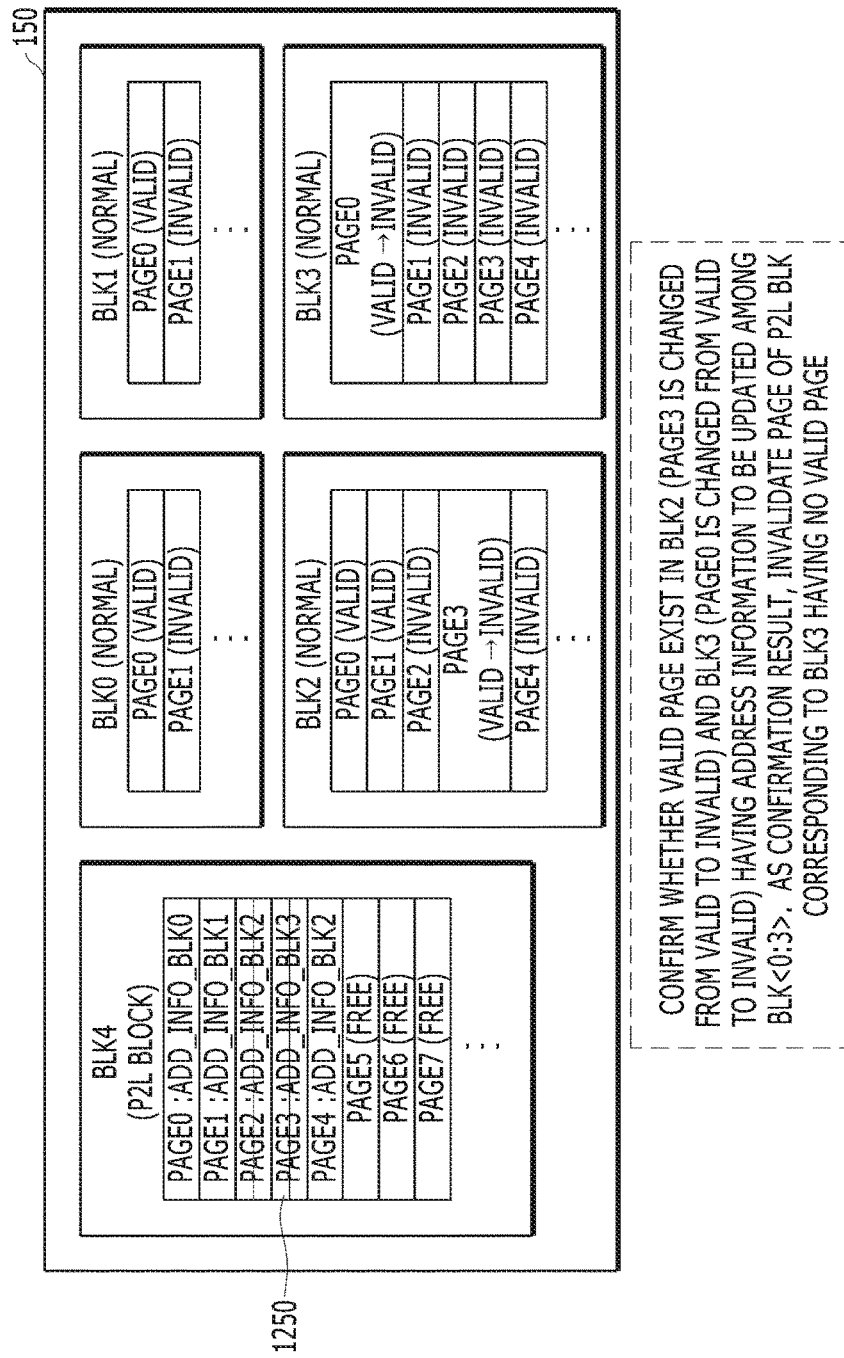

Referring to FIG. 12E, it can be understood that an operation for confirming whether a block having address information to be updated may include valid pages VALID among the normal blocks NORMAL and invalidating pages of a mapping block P2L BLOCK storing address information corresponding to a block confirmed not to include any valid pages VALID has been started.

For example, among the $0^{th}$ to third blocks BLK0 to BLK3 included in the normal blocks NORMAL, the second block BLK2 and the third block BLK3 are blocks having their own address information ADD_INFO_BLK2 and ADD_INFO_BLK3 to be updated. That is, since the third page PAGE3 is changed from a valid page VALID to an invalid page INVALID in the second block BLK2 and the $0^{th}$ page PAGE0 is changed from a valid page VALID to an invalid page INVALID in the third block BLK3, both the second address information ADD_INFO_BLK2 stored in the mapping block P2L BLOCK in correspondence to the second block BLK2 and the third address information ADD_INFO_BLK3 stored in the mapping block P2L BLOCK in correspondence to the third block BLK3 should be updated.

As described above, since the second block BLK2 and the third block BLK3 are blocks having their own address information ADD_INFO_BLK2 and ADD_INFO_BLK3 to be updated, it is confirmed whether valid pages VALID are included in a plurality of pages PAGE0, PAGE1, included in the second block BLK2 and whether valid pages VALID are included in a plurality of pages PAGE0, PAGE1, . . . , included in the third block BLK3. As a result of the confirmation, it can be understood that the valid pages VALID are included in the second block BLK2 and are not included in the third block BLK3.

Accordingly, the second address information ADD_INFO_BLK2 corresponding to the second block BLK2 including the valid pages VALID has been stored in a second page PAGE2 of a mapping block P2L BLOCK before update, but is moved to and stored in a fourth page PAGE4 simultaneously to the invalidation of the second page PAGE2 of the mapping block P2L BLOCK after the update.

Meanwhile, the third address information ADD_INFO_BLK3 corresponding to the third block BLK3 which does not include any valid pages VALID has been stored in a third page PAGE3 of the mapping block P2L BLOCK before update but it is not stored in the mapping block P2L BLOCK because the third page PAGE3 of the mapping block P2L BLOCK is invalidated after the update (1250).

Figure 13:
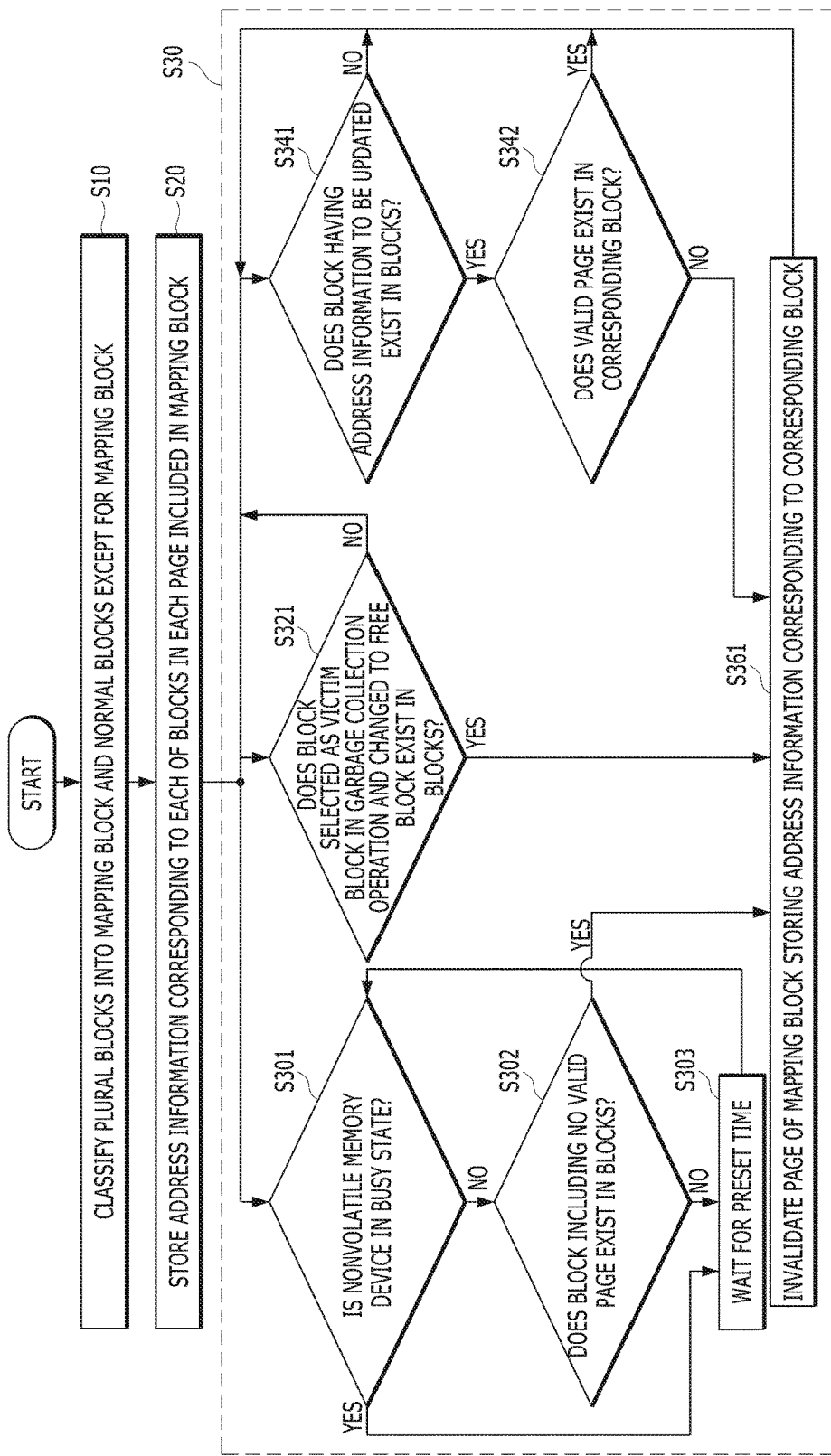
FIG. 13 is a flowchart illustrating a management operation of a mapping block in a memory system, according to an embodiment of the present invention.

FIG. 13 is a flowchart for illustrating a management operation of a mapping block in the memory system illustrated in FIG. 12A to FIG. 12E according to an embodiment of the present invention.

Referring to FIGS. 12A to 12E and FIG. 13, the memory system according to an embodiment of the present invention, may classify the plurality of memory blocks BLK0 to BLK4 included in the memory device 150 into a mapping block P2L BLOCK, a free block FREEB and normal blocks NORMAL (S10). Hence, all the hocks except for the mapping block P2L BLOCK and the free block FREEB are classified as normal blocks. For example, the fourth block BLK4 is classified as mapping block P2L BLOCK and the 0th to third blocks BLK0 to BLK3 are classified as normal blocks NORMAL.

Next, address information corresponding to each of the normal blocks NORMAL is stored in a respective plurality of pages PAGE0, PAGE1, . . . , included in the mapping block P2L BLOCK (S20). For example, the $0^{th}$ to third address information ADD_INFO_BLK0 to ADD_INFO_BLK3 respectively corresponding to the $0^{th}$ to third blocks BLK0 to BLK3 are respectively stored in the $0^{th}$ to third pages PAGE0 to PAGE3 included in the mapping block P2L BLOCK.

Then, a block which does not include any valid pages VALID is searched among the normal blocks NORMAL and pages of the mapping block P2L BLOCK storing address information corresponding to the searched block may be invalidated (S30).

As described above, the operation (S30) for searching for a block which does not include any valid pages VALID among the normal blocks NORMAL and invalidating the pages of the mapping block P2L BLOCK corresponding to the searched block may include the following operations.

It may be necessary to perform an operation for deciding a condition in which an operation (S302) for confirming the block which does not include any valid pages VALID exists in the normal blocks NORMAL is performed.

That is, it may be necessary to perform an operation (S301) for confirming whether the nonvolatile memory device 150 may be in a busy state. Furthermore, it may be necessary to perform an operation (S303) for deciding the frequency by which the operation (S302) for confirming whether each of the normal blocks NORMAL may include a valid page VALID is performed.

This may be because, the operation (S302) for confirming to whether each of the normal blocks NORMAL may not include any valid pages VALID may be a simple operation for confirming counting information of valid pages VALID of each of the normal blocks NORMAL. However, such operation may have an influence on a normal operation performed between the controller 130 and the memory device 150, such as a read, write, and or an erase operation.

For such an operation, as illustrated in the flowchart, the operation (S301) for confirming whether the nonvolatile memory device 150 is in the busy state may be allowed to be repeated (S303) at a preset time interval. In this state, as a result of the operation (S301) for confirming whether the nonvolatile memory device 150 is in the busy state, the operation (S302) for searching for the block which does not include any valid pages VALID among the normal blocks NORMAL may be selectively performed.

For example, when the nonvolatile memory device 150 is not in the busy state, the operations (S301, S302, and S303) for searching for a block which does not include any valid pages VALID among the normal blocks NORMAL may be repeated at a preset time interval. As a consequence, when a block which does not include any valid pages VALID exists in the normal blocks NORMAL, an operation (S361) for invalidating pages of a mapping block P2L BLOCK storing address information corresponding to the corresponding block which does not include any valid pages VALID may be performed.

Furthermore, it may be necessary to perform an operation (S321) for confirming whether a block exists in the normal blocks NORMAL which was selected as a victim block VICTM in a garbage collection operation and then was changed to a free block FREEB. This may be because, in the case of a normal block which was selected as the victim block VICTM in a garbage collection operation and changed to a free block FREEB, it may not be necessary to access the block newly changed to the free block FREEB before new data is written.

In this case, since the operation (S321) in which a block selected as the victim block VICTM to be used in the garbage collection operation among the normal blocks NORMAL is changed to the free block FREEB should be performed whenever a garbage collection operation is performed, there may not be a separate operation entrance condition.

In brief, in the case of performing the operation (S321) in which a block selected as the victim block VICTM to be used in the garbage collection operation among the normal blocks NORMAL is changed to the free block FREEB, the operation (S361) for invalidating pages of a mapping block P2L BLOCK storing address information corresponding to the block changed to the free block FREEB from the victim block VICTM may be performed.

Furthermore, subsequent to an operation (S341) for confirming whether a block having its own address information to be updated exists in the normal blocks NORMAL, it may be necessary to perform an operation (S342) for confirming whether a valid page VALID exists in the confirmed block.

This may be because, when a block having no valid page VALID while updating its own address information to be updated exists in the normal blocks NORMAL, it may not be necessary to access the corresponding block before the garbage collection operation is performed for the corresponding block, the corresponding block is changed to the free block FREEB, and the new data is written.

In this case, since the operation (S321) for confirming a block having no valid page VALID while updating its own address information to be updated among the normal blocks NORMAL should be performed whenever a block, address information of which is updated, is generated among the normal blocks NORMAL, there is no separate operation entrance condition.

For example, as a result obtained by performing the operations (S341 and S342) for confirming whether the valid page VALID is included in a block having its own address information to be updated among the normal blocks NORMAL, when the block is confirmed not to include any valid pages VALID after the address information is updated, the operation (S361) for invalidating the pages of the mapping block P2L BLOCK storing the address information corresponding to the corresponding block may be performed.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
    a nonvolatile memory device including a plurality of blocks, each block including a plurality of pages; and
    a controller configured to:
    select a mapping block and normal blocks from the plurality of blocks;
    store a plurality of address information corresponding to each of the normal blocks in each of the plurality of pages in the mapping block;
    determine whether the nonvolatile memory device is busy;
    repeatedly search, at a preset time interval, for a normal block which does not include valid pages among the normal blocks when the nonvolatile memory device is not busy;
    invalidate a page of the mapping block having an address information corresponding to the block which does not include valid pages among the normal blocks; and
    set a free block as a new mapping block which can only be used to include data copied from the mapping block and not from the normal blocks during a garbage collection operation,
    wherein, when the mapping block is selected as a victim block through the garbage collection operation, the controller copies only valid address information of the mapping block selected as the victim block into only the new mapping block, and
    wherein when data stored in the normal blocks is updated and a number of invalid address information stored in the mapping block is increased, the garbage collection operation is performed for the mapping block at a time point determined by a same criteria used for the garbage collection operation for the normal blocks.

2. The memory system of claim 1, wherein the controller is configured to select the normal blocks from the plurality of blocks except for the mapping block and any free block.

3. The memory system of claim 1, wherein the controller invalidates the page of the mapping block storing the address information corresponding to a block selected as a victim block among the normal blocks through a garbage collection operation and changed to a free block.

4. The memory system of claim 1, wherein the controller confirms whether a valid page is included in a block having its own address information to be updated among the normal blocks, and invalidates the page of the mapping block storing the address information corresponding to the block which does not include valid pages as a result of the confirmation.

5. The memory system of claim 1, wherein the address information corresponding to each of the normal blocks includes information for mapping a physical block address for selecting a block corresponding to its own block among the normal blocks and a physical page address for respectively selecting a valid page included in the block corresponding to its own block among the normal blocks with a logical address used in a host.

6. The memory system of claim 1, wherein the controller selects one or more of the plurality of blocks as the mapping block.

7. An operation method for a memory system including a nonvolatile memory device including a plurality of blocks, each block including a plurality of pages, the operation method comprising:
    selecting a mapping block and normal blocks from the plurality of blocks;
    storing a plurality of address information corresponding to each of the normal blocks in each of the plurality of pages in the mapping block;
    determining whether the nonvolatile memory device is busy;
    repeatedly searching, at a preset time interval, for the block which does not include valid pages among the normal blocks when the nonvolatile memory device is not busy;
    invalidating a page of the mapping block having an address information corresponding to a block which does not include valid pages among the normal blocks,
    classifying a free block as a new mapping block which can only be used to include data copied from the mapping block and not from the normal blocks when the mapping block is selected as a victim block through a garbage collection operation; and
    copying only valid address information of the mapping block selected as the victim block to only the new mapping block,
    wherein when data stored in the normal blocks is updated and a number of invalid address information stored in the mapping block is increased, the garbage collection operation is performed for the mapping block at a time point determined by a same criteria used for the garbage collection operation for the normal blocks.

8. The operation method of claim 7, wherein the selecting of the mapping block and the normal blocks comprises:
    selecting the normal blocks from the plurality of blocks except for the mapping block and any free block.

9. The operation method of claim 7, wherein the invalidating comprises:
    selecting a victim block to be used in a garbage collection operation from the normal blocks; and invalidating the page of the mapping block storing the address information corresponding to a block selected as a victim block among the normal blocks through a garbage collection operation when the block is changed to a free block.

10. The operation method of claim 7, wherein the invalidating comprises:

confirming whether a valid page is included in a block having its own address information to be updated among the normal blocks; and invalidating the page of the mapping block storing the address information corresponding to an update target block configured not to include valid pages as a result of the confirmation.

11. The operation method of claim 7, wherein the address information corresponding to each of the normal blocks includes information for mapping a physical block address for selecting a block corresponding to its own block among the normal blocks and a physical page address for respectively selecting valid pages included in the block corresponding to its own block among the normal blocks with a logic address used in a host.

12. The operation method of claim 7, wherein, in the classifying, one or more of the plurality of blocks are classified as the mapping block.

* * * * *